US007885157B2

(12) United States Patent
Kato et al.

(10) Patent No.: US 7,885,157 B2
(45) Date of Patent: Feb. 8, 2011

(54) INFORMATION RECORDING MEDIUM, APPARATUS, AND METHOD USING MANAGEMENT INFORMATION IDENTIFYING WHETHER OR NOT EMBOSSED PITS ARE FORMED IN A PREDETERMINED RECORDING AREA

(75) Inventors: Masahiro Kato, Saitama (JP); Eiji Muramatsu, Saitama (JP); Shoji Taniguchi, Saitama (JP); Eisaku Kawano, Saitama (JP)

(73) Assignee: Pioneer Corporation, Tokyo (JP)

( * ) Notice: Subject to any disclaimer, the term of this patent is extended or adjusted under 35 U.S.C. 154(b) by 408 days.

(21) Appl. No.: 12/065,762

(22) PCT Filed: Sep. 5, 2006

(86) PCT No.: PCT/JP2006/317500

§ 371 (c)(1),
(2), (4) Date: Mar. 5, 2008

(87) PCT Pub. No.: WO2007/029672

PCT Pub. Date: Mar. 15, 2007

(65) Prior Publication Data

US 2009/0161508 A1 Jun. 25, 2009

(30) Foreign Application Priority Data

Sep. 5, 2005 (JP) ............................ 2005-256956
Jan. 16, 2006 (JP) ............................ 2006-007983

(51) Int. Cl.
*G11B 15/04* (2006.01)

(52) U.S. Cl. .................................. 369/53.2; 369/275.3

(58) Field of Classification Search ...................... None
See application file for complete search history.

(56) References Cited

U.S. PATENT DOCUMENTS

2002/0060963 A1* 5/2002 Kobayashi ............... 369/47.55
2003/0185121 A1 10/2003 Narumi et al.
2005/0147002 A1* 7/2005 Hwang et al. ............ 369/47.14
2008/0074980 A1 3/2008 Narumi et al.

FOREIGN PATENT DOCUMENTS

CN 1447968 10/2003
JP 2000-311346 A 11/2000
JP 2000-331412 11/2000
JP 2001-23237 A 1/2001
JP 2003/036643 A1 5/2003
WO 03/036643 5/2003
WO 2004/036573 4/2004

OTHER PUBLICATIONS

International Search Report of PCT/JP2006/317500 dated Nov. 28, 2006.

* cited by examiner

*Primary Examiner*—Paul Huber
(74) *Attorney, Agent, or Firm*—Young & Thompson

(57) ABSTRACT

An information recording medium is provided with: a recording layer (L0 layer, L1 layer) having one or a plurality of predetermined recording areas (CDZ, 101 and the like) in which record data including buffer data in a finalizing process can be recorded; and a management area (CDZ) in which the management information (50*a*) can be recorded, the management information including first identification information (51*a*) for identifying whether or not embossed pits are formed in the predetermined recording area.

16 Claims, 15 Drawing Sheets

(a) 50: Management information

| Content |
| --- |
| First identification information about CDZ |
| First identification information about lead-in area |
| First identification information about middle area |
| First identification information about lead-out area |

(b) 50a: Embossed information (in CDZ)

| Data position | Content | Data amount (Bytes) |
| --- | --- | --- |
| 0~39 | ··· | ··· |
| 40 | EI Code | 1 |
| 41~2047 | ··· | ··· |

(c) 51a: EI Code

| Bit pattern | Content |
| --- | --- |
| 0000 0000 b | Embossed pits are formed in CDZ |
| 0000 0001 b | Embossed pits are NOT formed in CDZ |
| 0000 0000 b | Embossed pits are NOT formed in lead-in area |
| 0000 0010 b | Embossed pits are formed in lead-in area |
| 0000 0000 b | Embossed pits are NOT formed in middle area |
| 0000 0100 b | Embossed pits are formed in middle area |
| 0000 0000 b | Embossed pits are NOT formed in lead-out area |
| 0000 1000 b | Embossed pits are formed in lead-out area |

[FIG. 1]
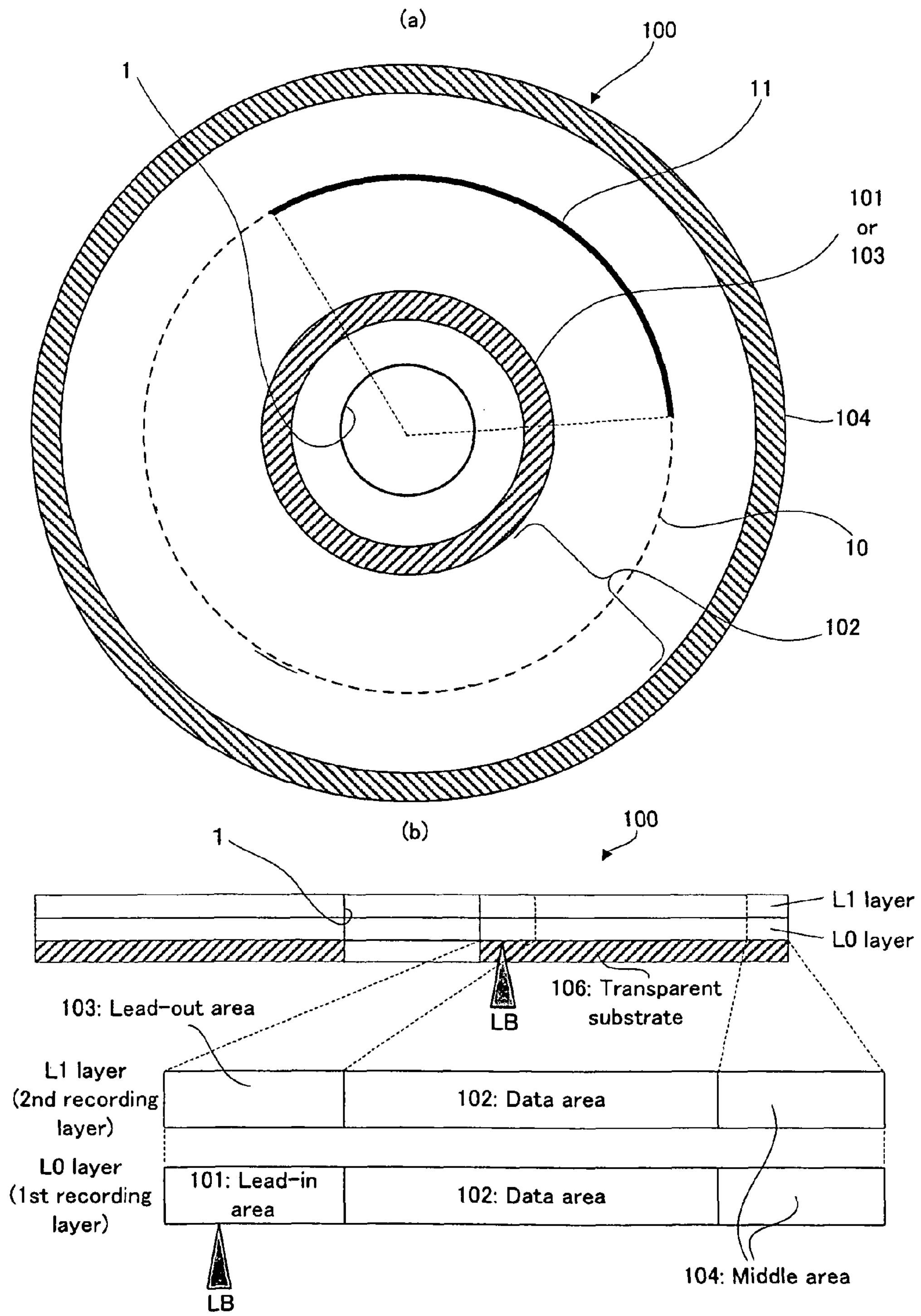

[FIG. 2]
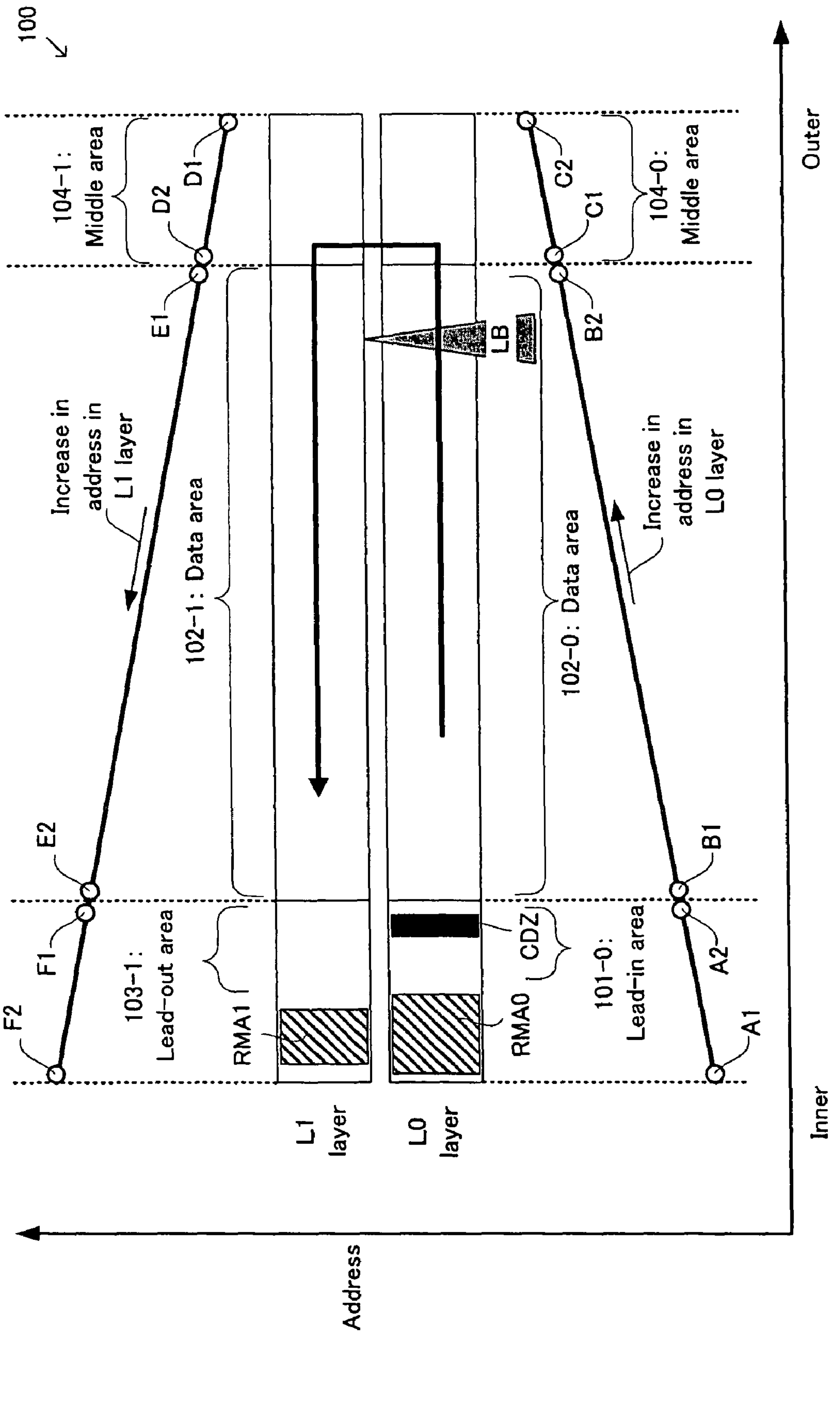

[FIG. 3]
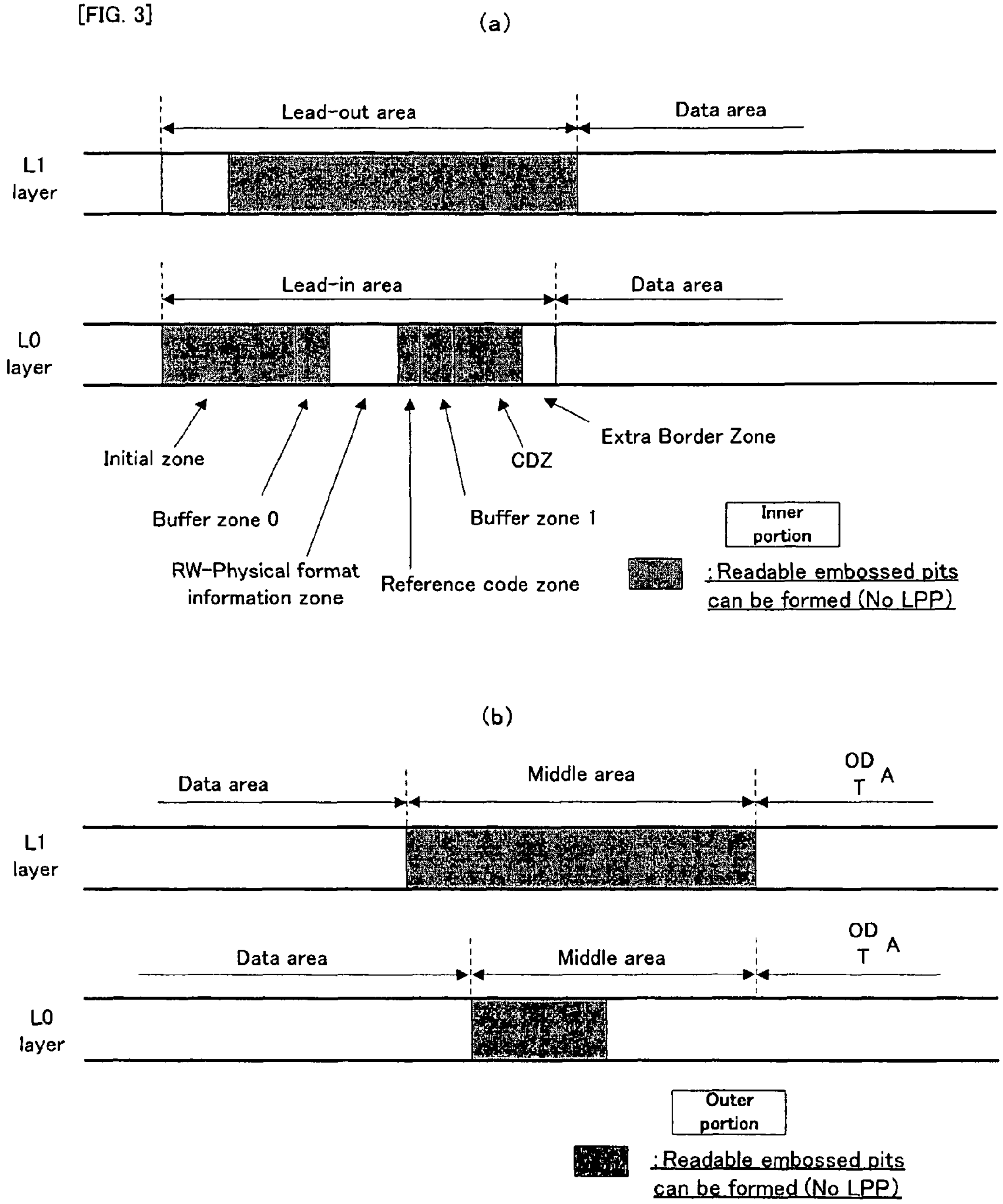

50: Management information

| Content |
| --- |
| First identification information about CDZ |
| First identification information about lead-in area |
| First identification information about middle area |
| First identification information about lead-out area |

(b)

50a: Embossed information (in CDZ)

| Data position | Content | Data amount (Bytes) |
| --- | --- | --- |
| 0~39 | ... | ... |
| 40 | EI Code | 1 |
| 41~2047 | ... | ... |

(c)

51a: EI Code

| Bit pattern | Content |
| --- | --- |
| 0000 0000 b | Embossed pits are formed in CDZ |
| 0000 0001 b | Embossed pits are NOT formed in CDZ |
| 0000 0000 b | Embossed pits are NOT formed in lead-in area |
| 0000 0010 b | Embossed pits are formed in lead-in area |
| 0000 0000 b | Embossed pits are NOT formed in middle area |
| 0000 0100 b | Embossed pits are formed in middle area |
| 0000 0000 b | Embossed pits are NOT formed in lead-out area |
| 0000 1000 b | Embossed pits are formed in lead-out area |

50: Management information

| Content | |
|---|---|
| Second identification information about CDZ | Position information about CDZ |
| Second identification information about lead-in area | Position information about lead-in area |
| Second identification information about middle area | Position information about middle area |
| Second identification information about lead-out area | Position information about lead-out area |

(b)

50b: PR information (in RMA)

| Data position | Content | Data amount (Bytes) |
|---|---|---|
| 0~89 | ... | ... |
| 90 | PRI Code | 1 |
| 91 | reserved | 1 |
| 92~95 | End address of pre-recorded lead-in | 4 |
| 96~99 | End address of pre-recorded middle area in L0 layer | 4 |
| 100~103 | Start address of pre-recorded middle area in L1 layer | 4 |
| 104~107 | Start address of pre-recorded lead-out | 4 |
| 108~2047 | ... | ... |

(c)

51b: PRI Code

| Bit pattern | Content |
|---|---|
| 0000 000<u>0</u> b | CDZ is pre-recorded |
| 0000 000<u>1</u> b | CDZ is NOT pre-recorded |
| 0000 00<u>0</u>0 b | Lead-in area is NOT pre-recorded |
| 0000 00<u>1</u>0 b | Lead-in is pre-recorded |
| 0000 0<u>0</u>00 b | Middle area is NOT pre-recorded |
| 0000 0<u>1</u>00 b | Middle area is pre-recorded |
| 0000 <u>0</u>000 b | Lead-out area is NOT pre-recorded |
| 0000 <u>1</u>000 b | Lead-out is pre-recorded |

50: Management information

| Content | |
|---|---|
| First + second identification information about CDZ | Position information about CDZ |
| First + second identification information about lead-in | Position information about lead-in area |
| First + second identification information about middle area | Position information about middle area |
| First + second identification information about lead-out | Position information about lead-out |

(b)

50c: PR information (in RMA)

| Data position | Content | Data amount (Bytes) |
|---|---|---|
| 0~89 | • • • | • • • |
| 90 | PRI Code | 1 |
| 91 | EI Code | 1 |
| 92~95 | End address of pre-recorded lead-in | 4 |
| 96~99 | End address of pre-recorded middle area in L0 layer | 4 |
| 100~103 | Start address of pre-recorded middle area in L1 layer | 4 |
| 104~107 | Start address of pre-recorded lead-out | 4 |
| 108~2047 | • • • | • • • |

50: Management information

| Content |
| --- |
| First + second identification information about CDZ |
| First + second identification information about lead-in |
| First + second identification information about middle area |
| First + second identification information about lead-out |

(b)

50d: Embossed information + PRI Code (in CDZ)

| Data position | Content | Data amount (Bytes) |
| --- | --- | --- |
| 0~39 | ... | ... |
| 40 | EI Code | 1 |
| ... | ... | ... |
| 43 | PRI Code | 1 |
| 44~2047 | ... | ... |

[FIG. 8]
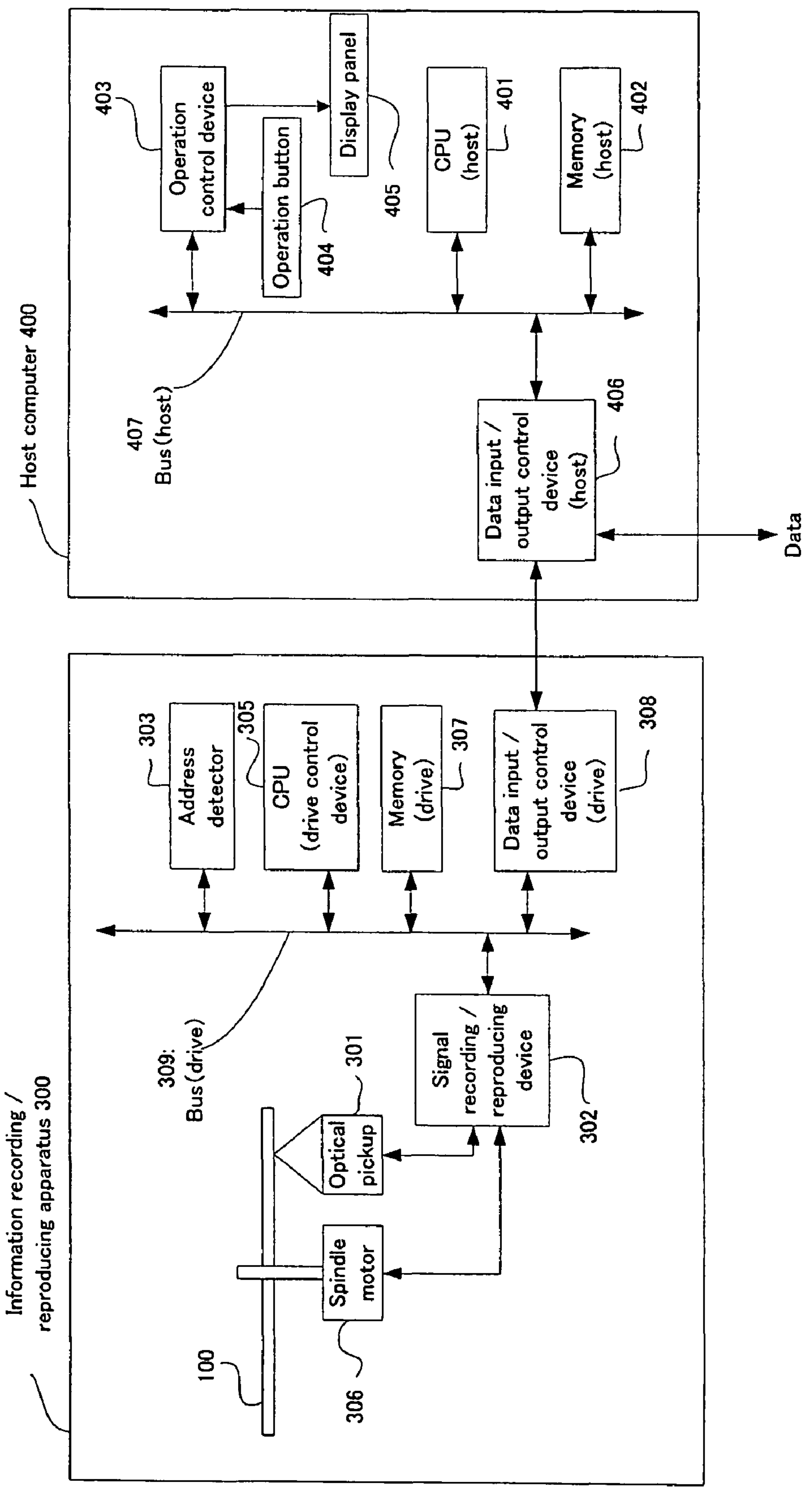

[FIG. 9]
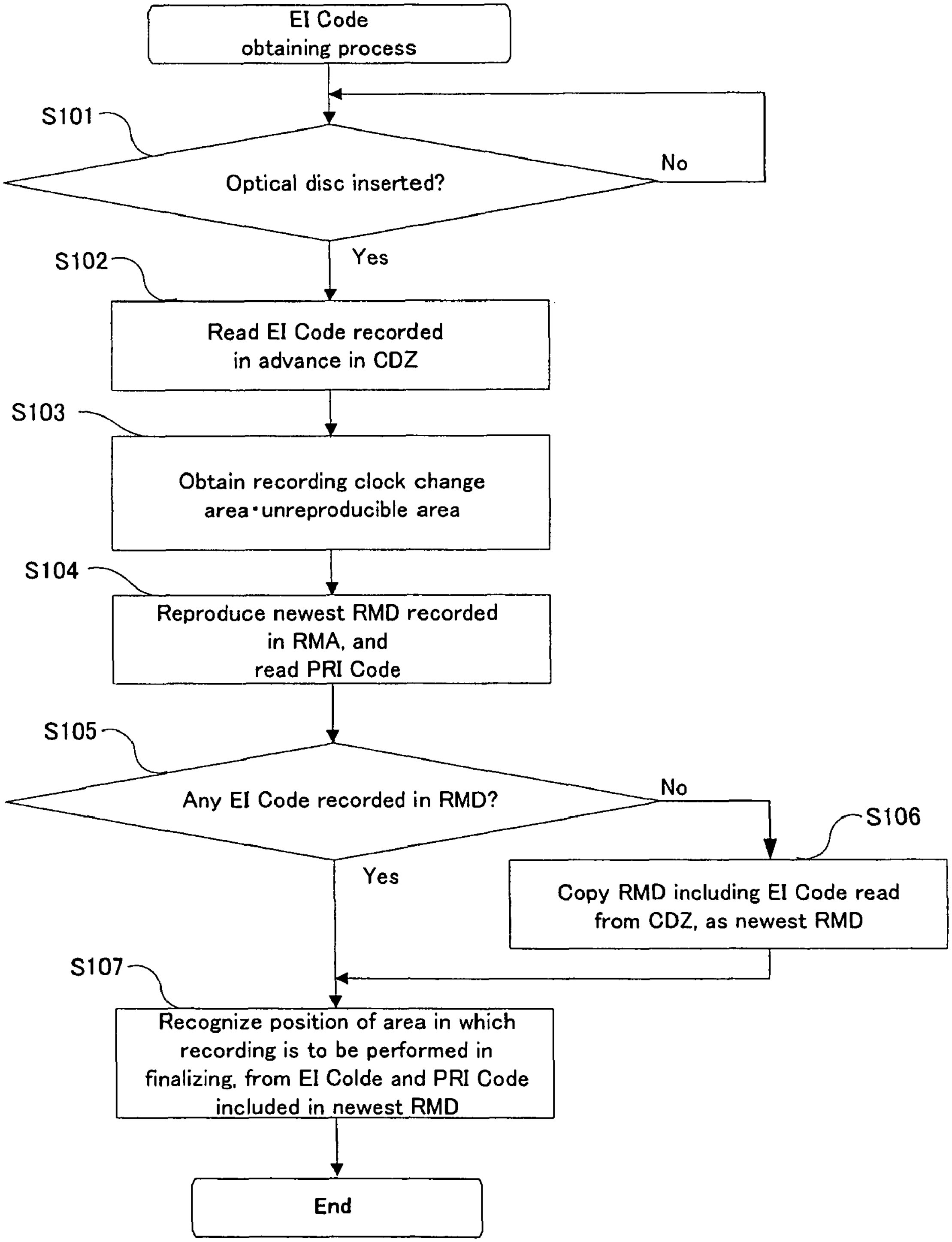

[FIG. 10]
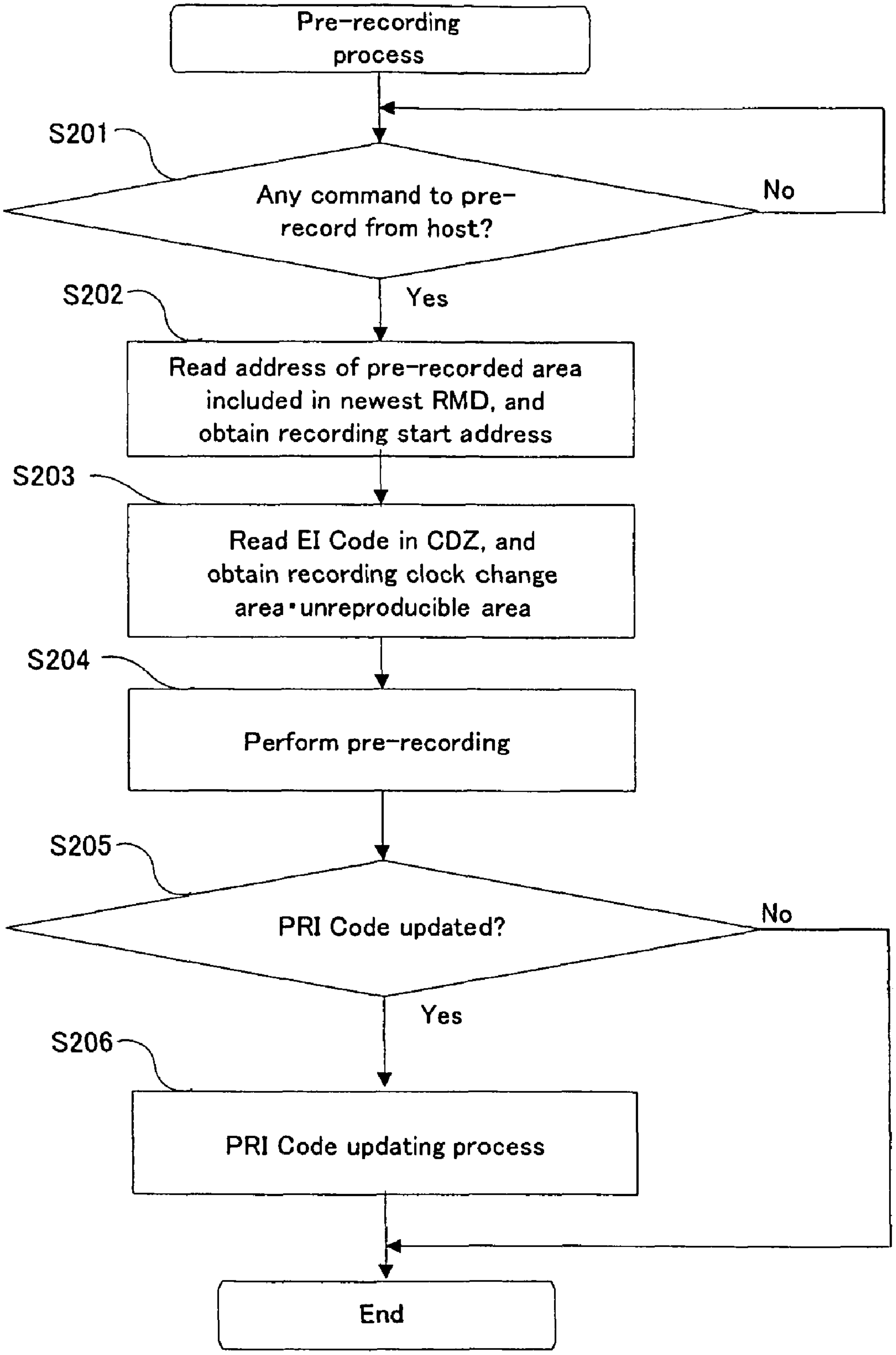

[FIG. 11]
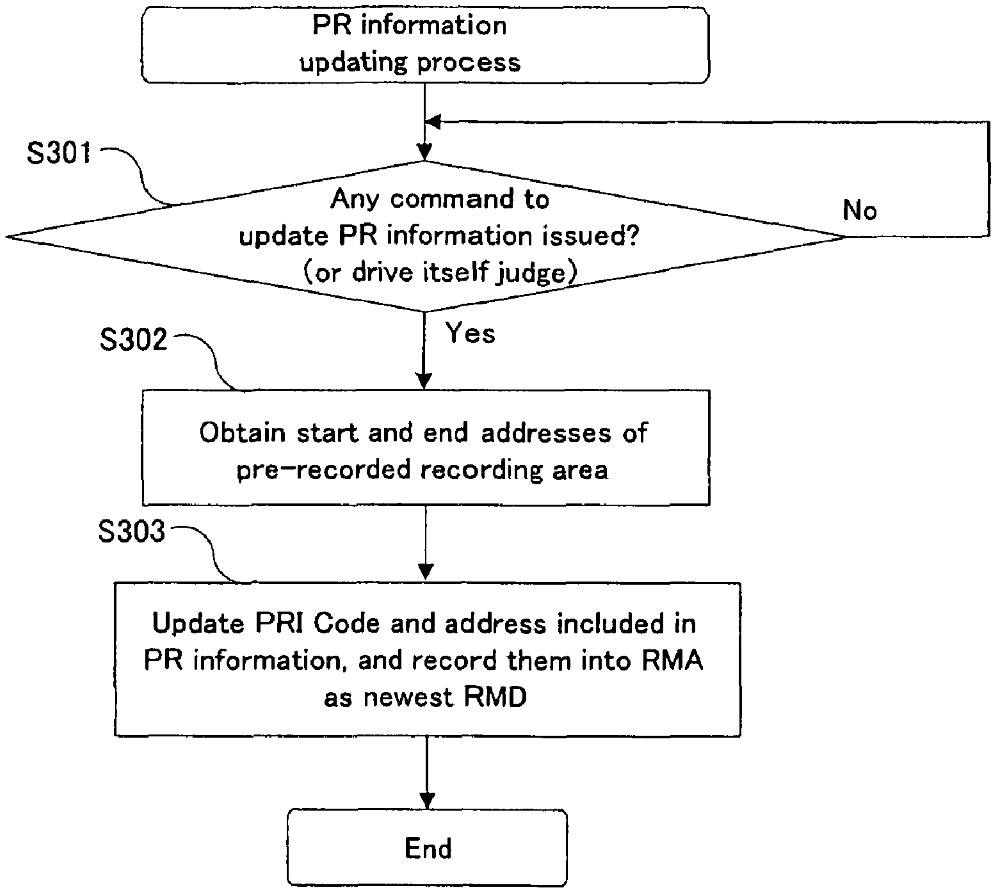

[FIG. 12]
(a)
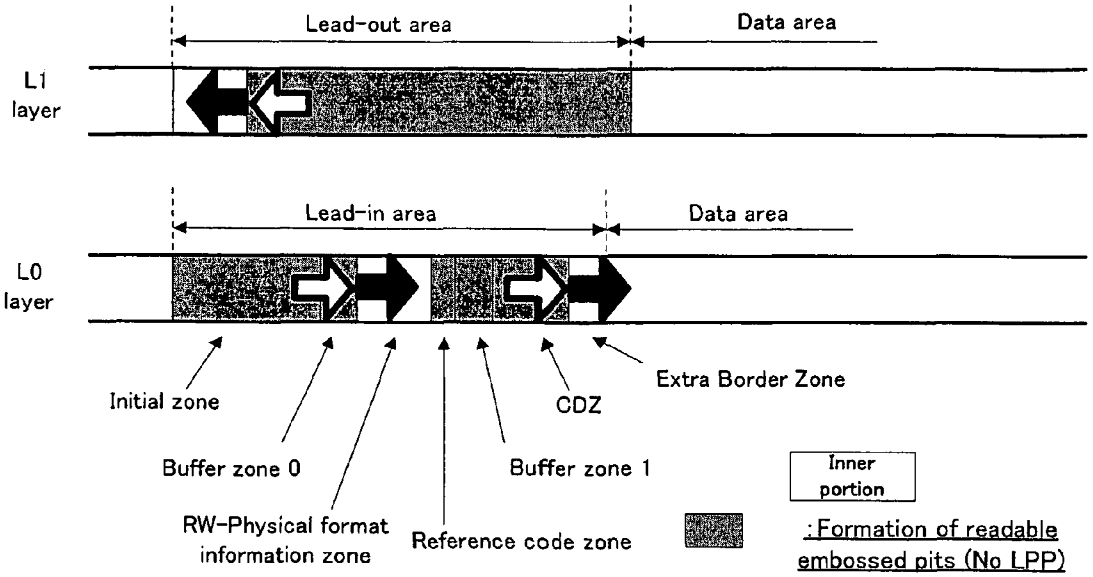
(b)
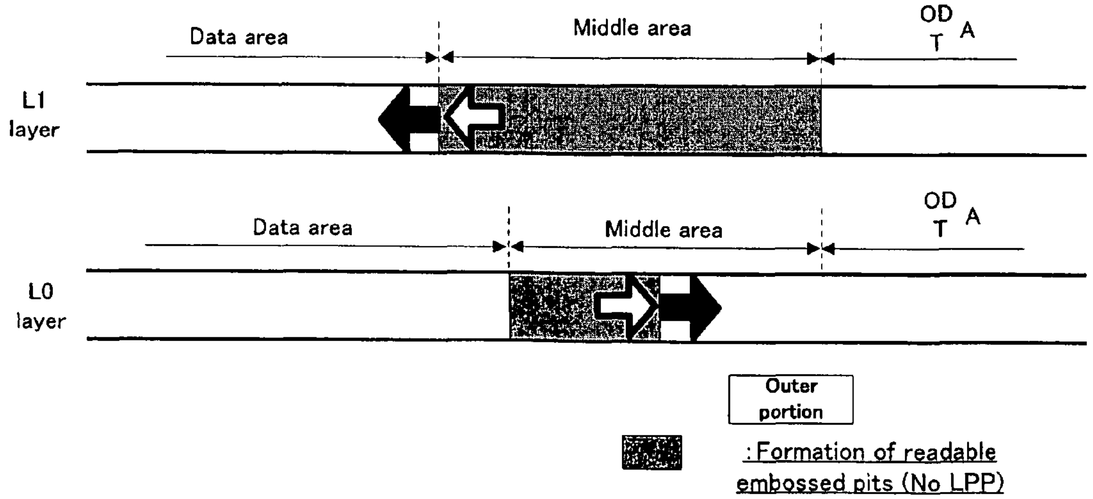

[FIG. 13]
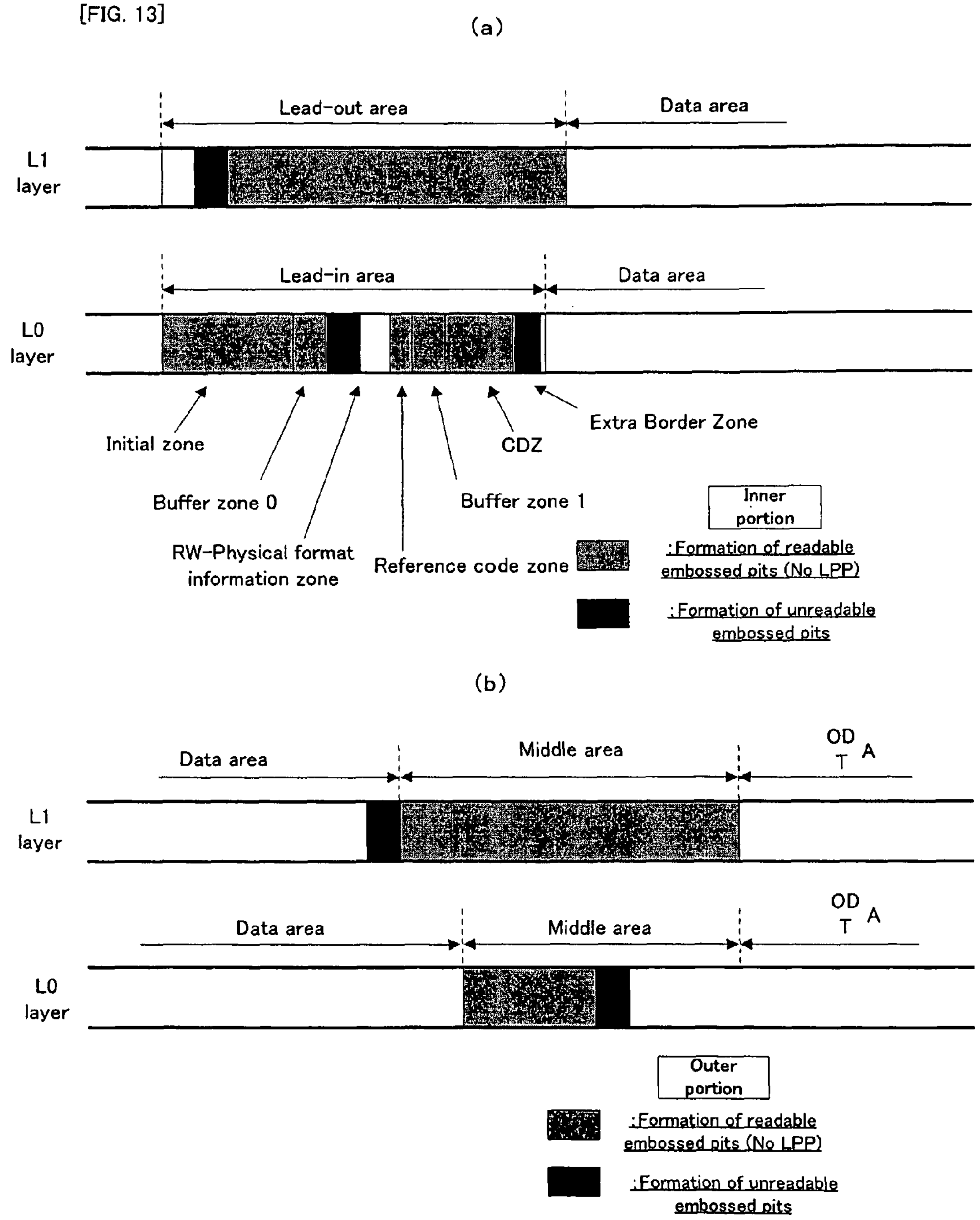

[FIG. 14]
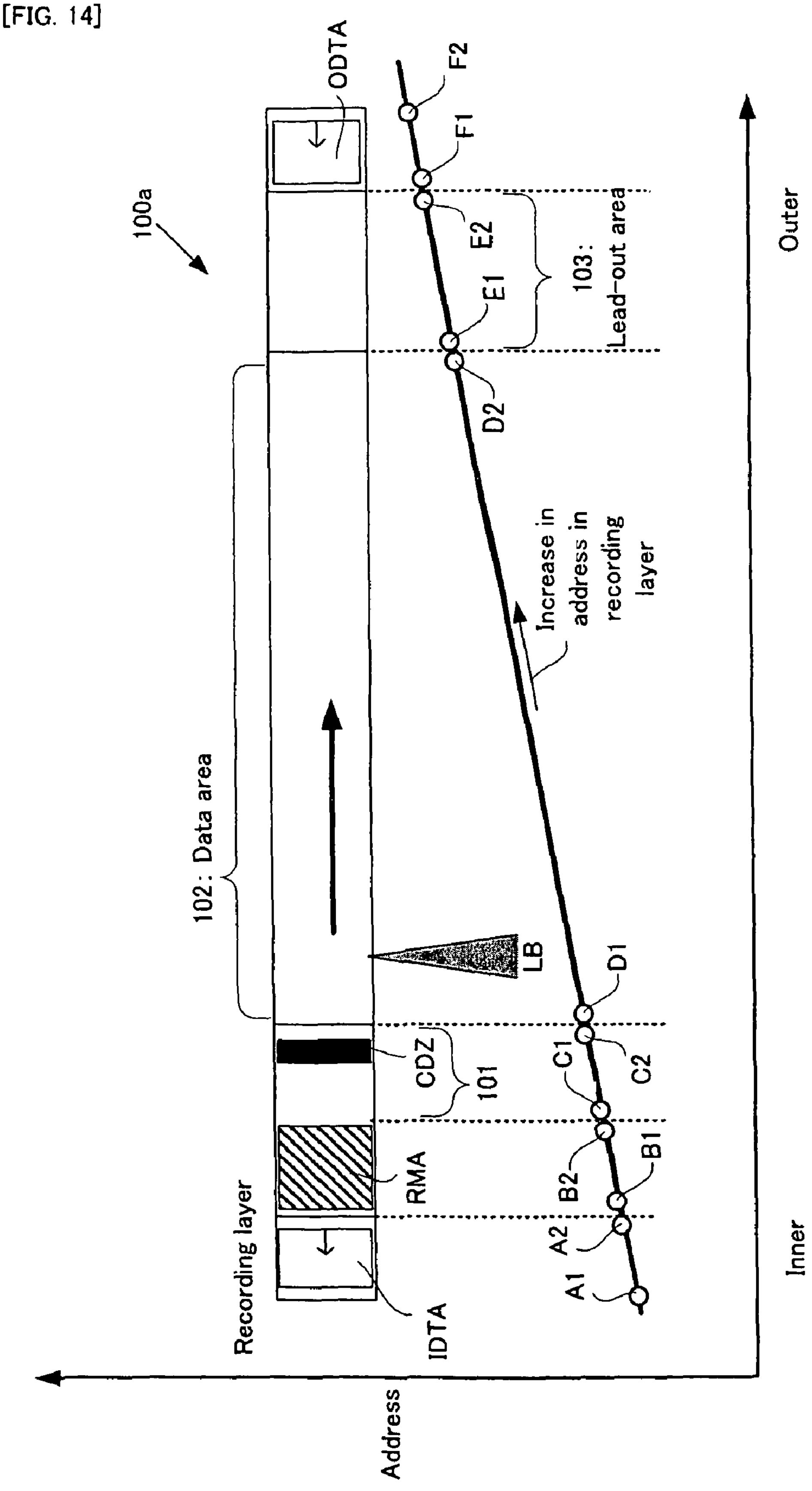

50: Management information

| Content | |
|---|---|
| Second identification information about CDZ | Position information about CDZ |
| Second identification information about lead-in | Position information about lead-in area |
| Second identification information about middle area | Position information about middle area |
| Second identification information about lead-out | Position information about lead-out |

(b)

50e: PR information (in RMA)

| Data position | Content | Data amount (Bytes) |
|---|---|---|
| 0~89 | ... | ... |
| 90 | PRI Code | 1 |
| 91 | reserved | 1 |
| 92~95 | End address of lead-in, pre-recorded or in which embosses are formed | 4 |
| 96~99 | End address of middle area in L0 layer, pre-recorded or in which embosses are formed | 4 |
| 100~103 | Start address of middle area in L1 layer, pre-recorded or in which embosses are formed | 4 |
| 104~107 | Start address of lead-out, pre-recorded or in which embosses are formed | 4 |
| 108~2047 | ... | ... |

(c)

51e: PRI Code

| Bit pattern | Content |
|---|---|
| 0000 0000 b | CDZ is pre-recorded, or embosses are formed therein |
| 0000 0001 b | CDZ is NOT pre-recorded, and embosses are NOT formed therein |
| 0000 0000 b | Lead-in area is NOT pre-recorded, and embosses are NOT formed therein |
| 0000 0010 b | Lead-in area is pre-recorded, or embosses are formed therein |
| 0000 0000 b | Middle area is NOT pre-recorded, and embosses are NOT formed therein |
| 0000 0100 b | Middle area is pre-recorded, or embosses are formed therein |
| 0000 0000 b | Lead-out area is NOT pre-recorded, and embosses are NOT formed therein |
| 0000 1000 b | Lead-out area is pre-recorded, or embosses are formed therein |

INFORMATION RECORDING MEDIUM, APPARATUS, AND METHOD USING MANAGEMENT INFORMATION IDENTIFYING WHETHER OR NOT EMBOSSED PITS ARE FORMED IN A PREDETERMINED RECORDING AREA

This application is a 371 of PCT/JP2006/317500, filed Sep. 5, 2006.

TECHNICAL FIELD

The present invention relates to an information recording medium, such as an optical disc, like a DVD (Digital Versatile Disc), a BD (Blu-ray Disc), a CD (Compact Disc) or the like, on which recoding and reproduction can be performed by irradiating it with laser light, a recording apparatus and a recording method for the information recording medium, a reproducing apparatus and a reproducing method, and a computer program.

BACKGROUND ART

In an information recording medium of a recording type, such as a CD-R (Compact Disc-Recordable), a DVD-R, a DVD-RW, and a DVD+R, for example, as described in patent documents 1 and 2, etc., there is also developed an information recording medium, such as an optical disc, of a multilayer type or dual layer type or multiple layer type, in which a plurality of recording layers are laminated or stacked on the same substrate. Then, on an information recording apparatus, such as a DVD recorder, which performs recording with respect to the dual layer type, i.e., two-layer type optical disc, information is recorded in an irreversible change recording method by heat or the like, or in a rewritable method, into a recording layer located on the front (i.e. on the closer side to an optical pickup) viewed from a laser light irradiation side (hereinafter referred to as an "L0 layer", as occasion demands), by focusing the laser light for recording on the L0 layer. On the other hand, information is recorded in the irreversible change recording method by heat or the like, or in the rewritable method, into a recording layer located on the rear (i.e. on the farther side to the optical pickup) viewed from the laser light irradiation side (hereinafter referred to as an "L1 layer", as occasion demands), by focusing the laser light for recording on the L1 layer through the L0 layer.

In the DVD-R DL (Dual Layer) standard, for example, in order to reduce a time length for a finalize process, pre-recording by laser light is performed, in a buffer area, such as a lead-in area and a lead-out area, for example, by a disc manufacturer. Incidentally, in a middle area out of the buffer area, for example, the pre-recording is performed by an information recording/reproducing apparatus, such as a DVD recorder, for example. Thus, even with regard to the DVD-RW DL (Dual Layer) standard, there is also proposed a method which enables the pre-recording by laser light, for example, in the buffer area, such as the lead-in area, the lead-out area, and the middle area, for example.

Patent document 1: Japanese Patent Application Laid Open NO. 2000-311346

Patent document 2: Japanese Patent Application Laid Open NO. 2001-23237

DISCLOSURE OF INVENTION

Subject to be Solved by the Invention

However, in a control data zone (hereinafter referred to as a "CDZ", as occasion demands) of the existing DVD-RW, readable embossed pits (hereinafter referred to as "embossed pits", as occasion demands) capable of reading disc information and address information or the like are formed. Thus, if the disc manufacturer (i) forms the readable embossed pits in the CDZ, and also (ii) performs the pre-recording (pre-writing) in the buffer area, such as the lead-in area, the lead-out area, and the middle area, for example, in order to reduce the time length required in the finalize process, manufacturing processes in the disc manufacturing are increased, so that there is a technical problem of an increase in manufacturing cost.

It is therefore an object of the present invention to provide an information recording medium, an information recording apparatus, an information recording method, an information reproducing apparatus, and an information reproducing method, which enable reduction in a recording time length in the finalize process and which also enable more appropriate and fast recording or reproduction, with respect to the information recording medium having a plurality of recording layers, and a computer program which makes a computer function as the information recording apparatus and the information reproducing apparatus.

Means for Solving the Subject (Information Recording Medium)

Hereinafter, the information recording medium of the present invention will be explained.

The above object of the present invention can be achieved by an information recording medium, provided with: a recording layer having one or a plurality of predetermined recording areas (CDZ, lead-in, middle, lead-out) in which record data including management information or buffer data can be recorded; and a management area (CDZ, RMA) in which the management information (embossed information) can be recorded, the management information including first identification information (EI Code) for identifying whether or not embossed pits are formed in the predetermined recording area.

According to the information recording medium of the present invention, the recording layer has (i) the predetermined recording area (e.g. a management area) in which the management information can be recorded, such as a control data zone, for example, or (ii) the predetermined recording area (e.g. a buffer area) in which buffer data can be recorded in a finalize process, such as a lead-in area, a middle area, and a lead-out area, for example. In the predetermined recording area, it is possible to form readable embossed pits. In addition, in the management area provided for the recording layer, it is possible to record in advance the management information including the first identification information for identifying whether or not embossed pits are formed in the predetermined recording area, by formation of embossed pits or pre-recording by laser light, performed by a disc manufacturer, for example.

As a result, an information recording/reproducing apparatus described later can recognize (specify) the position or the like of the area in which the readable embossed pits are formed, on the basis of the first identification information, so that it is possible to change a recording clock generation process so as to generate a recording clock from the readable embossed pits, instead of land pre-pits, in this area. Substantially in the same manner, it is possible to change the recording clock generation process so as to generate a recording clock from the land pre-pits, as usual, instead of the readable embossed pits, in the area in which the readable embossed pits are not formed.

Moreover, as a result, for example, the information recording/reproducing apparatus hardly needs or does not need at all to perform RF search or LPP search to search for the area in which the readable embossed pits are formed, so that it is possible to omit a time length required for the search from the recording/reproducing process. In the case of the information recording medium, such as a DVD-R DL (Dual Layer), for example, there is no management information including the first identification information for identifying whether or not embossed pits are formed. Thus, in the conventional technologies, in order to recognize (specify) a position in which the recording clock generation process is changed, the information recording/reproducing apparatus itself needs to perform the RF search for searching for an area in which a RF signal can be obtained and the LPP search for searching for an area in which an LPP signal can be obtained, for example, which causes extra time for the search. In contrast, in the present invention, the management information including the first identification information for identifying whether or not embossed pits are formed in the predetermined recording area of the present invention can be obtained by the information recording/reproducing apparatus, for example. Thus, it does not need to perform the RF search and the LPP search, for example, so that it is possible to omit the time length required for the search from the recording/reproducing process.

Moreover, as a result, for example, the information recording/reproducing apparatus can quickly and accurately recognize (specify) the area in which the buffer data is recorded, while identifying the area in which the readable embossed pits are formed, in the finalize process, on the basis of the first identification information of the present invention. Consequently, it is possible to realize great reduction and more efficient reduction in the time length for the finalize process, which enables the user to feel greater comfort in the finalize process.

In one aspect of the information recording medium of the present invention, the management information (embossed information) includes second identification information (PRI Code) for identifying whether or not pre-recording by laser light is performed in the predetermined recording area (lead-in, etc.).

According to this aspect, for example, the information recording/reproducing apparatus can quickly and accurately recognize (specify) the area in which the buffer data is recorded, while identifying the area in which the readable embossed pits are formed and the area in which the pre-recording by the laser light is performed, in the finalize process, on the basis of the first identification information in addition to the second identification information. Specifically, on the basis of the first identification information, it is possible to recognize (specify) the area in which the embossed pits are formed by the disc manufacturer and in which the buffer data does not have to be recorded. In addition, on the basis of the second identification information, it is possible to recognize (specify) the area in which the buffer data is already recorded by the pre-recording process by the laser light, for example, by the information recording/reproducing apparatus and in which the buffer data does not have to be recorded in the finalize process. Consequently, it is possible to realize great reduction and more efficient reduction in the time length for the finalize process, which enables the user to feel greater comfort in the finalize process.

In another aspect of the information recording medium of the present invention, the management information (embossed information) includes third identification information (PRI Code) for identifying whether or not at least one of (i) embossed pits are formed and (ii) pre-recording by laser light is performed, in the predetermined recording area (lead-in, etc.).

According to this aspect, for example, the information recording/reproducing apparatus can quickly and accurately recognize (specify) the area in which the buffer data is recorded, while identifying the area in which the readable embossed pits are formed and the area in which the pre-recording by the laser light is performed, in the finalize process, on the basis of the third identification information. Specifically, on the basis of the third identification information, it is possible to recognize (specify) the area in which the embossed pits are formed by the disc manufacturer and in which the buffer data does not have to be recorded. In addition, on the basis of the third identification information, it is possible to recognize (specify) the area in which the buffer data is already recorded by the pre-recording process by the laser light, for example, by the information recording/reproducing apparatus and in which the buffer data does not have to be recorded in the finalize process. Consequently, it is possible to realize great reduction and more efficient reduction in the time length for the finalize process, which enables the user to feel greater comfort in the finalize process.

In another aspect of the information recording medium of the present invention, the management information (embossed information) includes position information capable of specifying a position in which (i) embossed pits are formed or a position in which (ii) pre-recording by laser light is performed, in the predetermined recording area (lead-in, etc.).

According to this aspect, for example, the information recording/reproducing apparatus can highly accurately and appropriately recognize (specify) the area in which the buffer data is recorded, in the finalize process, for example, on the basis of the position information in addition to the first identification information.

In another aspect of the information recording medium of the present invention, the first identification information (EI Code) can identify (i) whether or not embossed pits are formed in at least one portion of the predetermined recording area, or (ii) whether or not embossed pits are formed in one portion or all of the predetermined recording area.

According to this aspect, for example, the information recording/reproducing apparatus can highly accurately and appropriately recognize (specify) the area in which the buffer data is recorded, in the finalize process, for example, in accordance with more clarified and segmentalized recording areas, which are one portion of all of the predetermined recording area, on the basis of the position information in addition to the first identification information.

In another aspect of the information recording medium of the present invention, at least the first identification information (EI Code) can identify whether or not embossed pits are formed, in the plurality of predetermined recording areas, in a predetermined bit pattern.

According to this aspect, for example, the information recording/reproducing apparatus can identify whether or not embossed pits are formed in the plurality of predetermined recording areas, more quickly and highly accurately, on the basis of the predetermined bit pattern.

In another aspect of the information recording medium of the present invention, the management information is recorded in advance by (i) formation of embossed pits or (ii) pre-recording by laser light, in the management area.

According to this aspect, it is possible to simplify the recording of the management information performed by the disc manufacturer, for example.

In another aspect of the information recording medium of the present invention, the predetermined recording area is at least one of a control data zone, a lead-in area, a middle area, and a lead-out area.

According to this aspect, it is possible to simplify the finalize process performed by the information recording/reproducing apparatus, for example.

In another aspect of the information recording medium of the present invention, the management information (embossed information) includes information about a recording capacity (16ECC blocks) of an unreadable area in which the record information cannot be read, in which unreadable embossed pits are formed and which is adjacent to the predetermined recording area.

According to this aspect, for example, the information recording/reproducing apparatus can recognize (specify) the position of the area in which the readable embossed pits are formed, and the position of the area, located adjacent thereto, in which the unreadable embossed pits are formed. Therefore, even if it cannot obtain address information because a reproduction error occurs, for example, in the area in which the unreadable embossed pits are formed, the information recording/reproducing apparatus can realize a recording/reproducing operation including a file safe process, such as predicting and ignoring the reproduction error which occurs in this area.

(Information Recording Apparatus)

Hereinafter, the information recording apparatus of the present invention will be explained.

The above object of the present invention can be also achieved by an information recording apparatus for recording the record data onto the above-mentioned information recording medium of the present invention (including its various aspects), the information recording apparatus provided with: an obtaining device for obtaining the management information from the management area; a recording device for recording the record data; and a controlling device for controlling the recording device to record the record data, on the basis of the obtained management information.

According to the information recording apparatus of the present invention, firstly, by the obtaining device, the management information is obtained including the first identification information and the second identification information, for example. Then, under the control of the controlling device, the record data including the buffer data in the finalize process, for example, is recorded by the recording device.

As a result, the information recording apparatus can recognize (specify) the position or the like of the area in which the readable embossed pits are formed, on the basis of the first identification information, so that it is possible to change the recording clock generation process so as to generate a recording clock from the readable embossed pits, instead of land pre-pits, in this area. Substantially in the same manner, it is possible to change the recording clock generation process so as to generate a recording clock from the land pre-pits, as usual, instead of the readable embossed pits, in the area in which the readable embossed pits are not formed.

Moreover, as a result, the information recording apparatus hardly needs or does not need at all to perform RF search or LPP search to search for the area in which the readable embossed pits are formed, so that it is possible to omit the time length required for the search from the recording process.

Moreover, as a result, the information recording apparatus can quickly and accurately recognize (specify) the area in which the buffer data is recorded, while identifying the area in which the readable embossed pits are formed, in the finalize process, on the basis of the first identification information and the second identification information, for example. Consequently, it is possible to realize great reduction and more efficient reduction in the time length for the finalize process, which enables the user to feel greater comfort in the finalize process.

Incidentally, in response to the various aspects owned by the above-mentioned information recording medium of the present invention, the information recording apparatus of the present invention can adopt various aspects.

In one aspect of the information recording apparatus of the present invention, it is further provided with an updating device for updating the management information on the basis of the recording of the record data.

According to this aspect, the information recording apparatus can quickly and accurately recognize (specify) the area in which the buffer data is recorded, in the finalize process, for example, on the basis of the updated management information, while reflecting the newest state of the recording area in which the record data is recorded.

In another aspect of the information recording apparatus of the present invention, the controlling device controls the recording device to record buffer data in a finalize process.

According to this aspect, the information recording apparatus can quickly and accurately recognize (specify) the area in which the buffer data is recorded, in the finalize process, for example, on the basis of the management information.

In another aspect of the information recording apparatus of the present invention, the controlling device controls the recording device to record buffer data in a pre-recording process.

According to this aspect, the information recording apparatus can quickly and accurately recognize (specify) the area in which the buffer data is recorded, in the pre-recording process, for example, on the basis of the management information.

(Information Reproducing Apparatus)

Hereinafter, the information reproducing apparatus of the present invention will be explained.

The above object of the present invention can be also achieved by an information reproducing apparatus for reproducing the record data from the above-mentioned information recording medium of the present invention (including its various aspects), the information reproducing apparatus provided with: an obtaining device for obtaining the management information from the management area; a reproducing device for reproducing the record data; and a controlling device for controlling the reproducing device to reproduce the record data, on the basis of the obtained management information.

According to the information reproducing apparatus of the present invention, firstly, by the obtaining device, the management information is obtained including the first identification information and the second identification information, for example. Then, under the control of the controlling device, the record data including the management data, for example, is reproduced by the reproducing device.

As a result, the information reproducing apparatus can recognize (specify) the position or the like of the area in which the readable embossed pits are formed, on the basis of the first identification information, so that it is possible to change a reproducing clock generation process so as to generate a reproducing clock from the readable embossed pits, instead of land pre-pits, in this area. Substantially in the same manner, it is possible to change the reproducing clock generation process so as to generate a reproducing clock from the land pre-pits, as usual, instead of the readable embossed pits, in the area in which the readable embossed pits are not formed.

Moreover, as a result, the information reproducing apparatus hardly needs or does not need at all to perform RF search or LPP search to search for the area in which the readable embossed pits are not formed, so that it is possible to omit a time length required for the search from the reproducing process.

Incidentally, in response to the various aspects owned by the above-mentioned information recording medium of the present invention, the information reproducing apparatus of the present invention can adopt various aspects.

(Information Recording Method)

Hereinafter, the information recording method of the present invention will be explained.

The above object of the present invention can be also achieved by an information recording method in an information recording apparatus provided with a recording device for recording the record data onto the above-mentioned information recording medium of the present invention (including its various aspects), the information recording method provided with: an obtaining process of obtaining the management information from the management area; and a controlling process of controlling the recording device to record the record data, on the basis of the obtained management information.

According to the information recording method of the present invention, it is possible to receive the various benefits owned by the above-mentioned information recording apparatus of the present invention.

Incidentally, in response to the various aspects owned by the above-mentioned information recording apparatus of the present invention, the information recording method of the present invention can adopt various aspects.

(Information Reproducing Method)

Hereinafter, the information reproducing method of the present invention will be explained.

The above object of the present invention can be also achieved by an information reproducing method in an information reproducing apparatus provided with a reproducing device for reproducing the record data from the above-mentioned information recording medium of the present invention (including its various aspects), the information reproducing method provided with: an obtaining process of obtaining the management information from the management area; and a controlling process of controlling the reproducing device to reproduce the record data, on the basis of the obtained management information.

According to the information reproducing method of the present invention, it is possible to receive the various benefits owned by the above-mentioned information reproducing apparatus of the present invention.

Incidentally, in response to the various aspects owned by the above-mentioned information reproducing apparatus of the present invention, the information reproducing method of the present invention can adopt various aspects.

(Computer Program)

Hereinafter, the computer program of the present invention will be explained.

The above object of the present invention can be also achieved by a computer program for record control to control a computer provided for the above-mentioned information recording apparatus of the present invention (including its various aspects), the computer program making the computer function as at least one portion of the obtaining device, the recording device, and the controlling device.

The above object of the present invention can be also achieved by a computer program for reproduction control to control a computer provided for the above-mentioned information reproducing apparatus of the present invention (including its various aspects), the computer program making the computer function as at least one portion of the obtaining device, the reproducing device, and the controlling device.

According to the computer programs of the present invention, the above-mentioned information recording apparatus or information reproducing apparatus of the present invention can be embodied relatively readily, by loading the computer program from a recording medium for storing the computer program, such as a ROM, a CD-ROM, a DVD-ROM, a hard disk or the like, into the computer, or by downloading the computer program, which may be a carrier wave, into the computer via a communication device.

Incidentally, in response to the various aspects owned by the above-mentioned information recording apparatus or information reproducing apparatus of the present invention, each of the computer programs of the present invention can adopt various aspects.

The above object of the present invention can be also achieved by a first computer program product in a computer-readable medium for tangibly embodying a program of instructions executable by a computer provided in the aforementioned information recording apparatus of the present invention (including its various aspects), to make the computer function as at least one portion of the obtaining device, the recording device, and the controlling device.

The above object of the present invention can be also achieved by a second computer program product in a computer-readable medium for tangibly embodying a program of instructions executable by a computer provided in the aforementioned information reproducing apparatus of the present invention (including its various aspects), to make the computer function as at least one portion of the obtaining device, the reproducing device, and the controlling device.

According to the first or second computer program product of the present invention, the aforementioned information recording apparatus or information reproducing apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned information recording apparatus or information reproducing apparatus of the present invention.

These effects and other advantages of the present invention will become more apparent from the embodiments explained below.

As explained above, according to the information recording medium of the present invention, it is provided with: the recording layer having one or a plurality of predetermined recording areas; and the management area (CDZ, RMA) in which the management information can be recorded, the management information including the first identification information for identifying whether or not embossed pits are formed and the second identification information for identifying whether or not prerecording by laser light is performed, in the predetermined recording area. As a result, for example, the information recording/reproducing apparatus can quickly and accurately recognize (specify) the area in which the buffer data is recorded, while identifying the area in which the readable embossed pits are formed, in the finalize process, on the basis of the first identification information and the second identification information of the present invention, for example. Consequently, it is possible to realize great reduction and more efficient reduction in the time length for the finalize process, which enables the user to feel greater comfort in the finalize process.

Moreover, according to the information recording apparatus of the present invention, it is provided with: the obtaining device; the recording device; and the controlling device, and according to the information recording method of the present invention, it is provided with: the obtaining process; and the controlling process. As a result, the information recording apparatus can recognize (specify) the position or the like of the area in which the readable embossed pits are formed, on the basis of the first identification information, so that it is possible to change the recording clock generation process so as to generate a recording clock from the readable embossed pits, instead of land pre-pits, in this area. Substantially in the same manner, it is possible to change the recording clock generation process so as to generate a recording clock from the land pre-pits, as usual, instead of the readable embossed pits, in the area in which the readable embossed pits are not formed.

Moreover, according to the information reproducing apparatus of the present invention, it is provided with: the obtaining device; the reproducing device; and the controlling device, and according to the information reproducing method of the present invention, it is provided with: the obtaining process; and the controlling process. As a result, the information reproducing apparatus can recognize (specify) the position or the like of the area in which the readable embossed pits are formed, on the basis of the first identification information, so that it is possible to change the reproducing clock generation process so as to generate a reproducing clock from the readable embossed pits, instead of land pre-pits, in this area. Substantially in the same manner, it is possible to change the reproducing clock generation process so as to generate a reproducing clock from the land pre-pits, as usual, instead of the readable embossed pits, in the area in which the readable embossed pits are not formed.

Furthermore, according to the computer program of the present invention, it makes a computer function as the above-mentioned information recording apparatus or the information reproducing apparatus. Thus, with respect to the above-mentioned rewritable type optical disc, such as a DVD-R DL (Dual Layer), for example, the information recording apparatus and the information reproducing apparatus can recognize (specify) the position or the like of the area in which the readable embossed pits are formed, on the basis of the first identification information, so that it is possible to change the recording or reproducing clock generation process so as to generate a recording or reproducing clock from the readable embossed pits, instead of land pre-pits, in this area. Substantially in the same manner, it is possible to change the recording or reproducing clock generation process so as to generate a recording or reproducing clock from the land pre-pits, as usual, instead of the readable embossed pits, in the area in which the readable embossed pits are not formed.

BRIEF DESCRIPTION OF DRAWINGS

FIG. 1 are a substantial plan view showing the basic structure of an optical disc having a plurality of recording areas in an embodiment of the information recording medium of the present invention (FIG. 1(*a*)), and a conceptual view showing a recording area structure in the radial direction, in association with the substantial plan view of the optical disc.

FIG. 2 is a conceptual graph showing the data structure of a two-layer type optical disc in the embodiment of the information recording medium of the present invention, an address, such as a physical sector number of a sector constituting an ECC block, in the recording areas of the optical disc, and a recording or reproduction method by an opposite method of the optical disc.

FIG. 3 are schematic diagrams showing areas in which readable embossed pits can be formed, on the inner and outer circumferential sides of the information recording medium of the present invention.

FIG. 4 are a table showing one specific example of management information of the present invention (FIG. 4(*a*)), a table showing a specific example of the data structure of embossed information associated with the management information of the present invention (FIG. 4(*b*)), and a table showing a specific example of an EI (Embossed Information) Code associated with first identification information of the present invention (FIG. 4(*c*)).

FIG. 5 are a table showing another specific example of management information of the present invention (FIG. 5(*a*)), a table showing a specific example of the data structure of PR information associated with the management information of the present invention (FIG. 5(*b*)), and a table showing a specific example of a PRI (Pre-recorded Information) Code associated with second identification information of the present invention (FIG. 5(*c*)).

FIG. 6 are a table showing another specific example of management information of the present invention (FIG. 6(*a*)), and a table showing a specific example of the data structure of the PR information associated with the management information of the present invention (FIG. 6(*b*)).

FIG. 7 are a table showing another specific example of management information of the present invention (FIG. 7(*a*)), and a table showing a specific example of the data structure of the embossed information associated with the management information of the present invention (FIG. 7(*b*)).

FIG. 8 is a block diagram showing the basic structures of an information recording/reproducing apparatus in an embodiment of the information recording apparatus of the present invention and a host computer;

FIG. 9 is a flowchart showing a process of obtaining an EI (Embossed Information) Code 51*a* by the information recording/reproducing apparatus in the embodiment of the information recording apparatus of the present invention.

FIG. 10 is a flowchart showing a pre-recording process by the information recording/reproducing apparatus in the embodiment of the information recording apparatus of the present invention.

FIG. 11 is a flowchart showing a process of updating a PRI Code 51*b* by the information recording/reproducing apparatus in the embodiment of the information recording apparatus of the present invention.

FIG. 12 are schematic diagrams showing areas in which readable embossed pits are formed, on the inner and outer circumferential sides of the information recording medium of the present invention.

FIG. 13 are schematic diagrams showing areas in which readable embossed pits are formed and areas in which unreadable embossed pits are formed, on the inner and outer circumferential sides of the information recording medium of the present invention.

FIG. 14 is a conceptual graph showing the data structure of a single-layer type optical disc in a second embodiment of the information recording medium of the present invention, an address, such as a physical sector number of a sector constituting an ECC block, in the recording areas of the optical disc, and a recording or reproduction method by an opposite method of the optical disc.

FIG. 15 are a table showing another specific example of management information of the present invention (FIG. 15(*a*)), a table showing a specific example of the data structure of the PR information associated with the management information of the present invention (FIG. 15(*b*)), and a table showing a specific example of the PRI (Pre-recorded Information) Code associated with third identification information of the present invention (FIG. 15(*c*)).

DESCRIPTION OF REFERENCE CODES

1 . . . center hole, 10 . . . track, 11 . . . ECC block, 50 . . . management information, 50*a* . . . embossed information, 50*b* (50*e*). PR information, 51*a* . . . EI code, 51*b* (51*e*) . . . PRI code, 100 . . . optical disc, 101 . . . lead-in area, 102 . . . data area, 103 . . . lead-out area, 104 . . . middle area, 104*s* . . . shifted middle area, 300 . . . information recording/reproducing apparatus, 301 . . . optical pickup, 302 . . . signal recording/reproducing device, 303 . . . address detector, 305 . . . CPU (drive control device), 306 . . . spindle motor, 307 (402) . . . memory, 308 (406) . . . data input/output control device, 309 (407) . . . bus, 400 . . . host computer, 401 . . . CPU (for host), 403 . . . operation control device, 404 . . . operation button, 405 . . . display panel, CDZ . . . control data zone, RMA . . . recording management area, LB . . . laser light, FS1 (FS0) . . . file system

DETAILED DESCRIPTION OF THE PREFERRED EMBODIMENTS

Hereinafter, the embodiments of the present invention will be explained with reference to the drawings.

(1) Embodiment of Information Recording Medium

Next, with reference to FIG. 1 to FIG. 7, an embodiment of the information recording medium of the present invention will be discussed in detail.

(1-1) Basic Structure

Firstly, with reference to FIG. 1, the basic structure of an optical disc in an embodiment of the information recording medium of the present invention will be explained. FIG. 1 are a substantial plan view showing the basic structure of the optical disc having a plurality of recording areas in the embodiment of the information recording medium of the present invention (FIG. 1(*a*)), and a conceptual view showing a recording area structure in the radial direction and associated with the substantial plan view of the optical disc. Incidentally, in the optical disc in the embodiment, the opposite method is applied, as one specific example of a recording method, in which the track path of an L0 layer and the track path of an L1 layer have opposite recording directions.

As shown in FIG. 1(*a*) and FIG. 1(*b*), an optical disc 100 has a recording surface on a disc main body with a diameter of about 12 cm, as is a DVD. On the recording surface, the optical disc 100 is provided with: a center hole 1 as the center; a lead-in area 101 or a lead-out area 103; a data area 102; and a middle area 104, which are associated with the embodiment. Then, for example, on a transparent substrate 106 of the optical disc 100, there are laminated recording layers, such as the L0 layer and the L1 layer. In each recording area of the recording layers, a track or tracks 10, such as groove tracks and land tracks, are alternately placed, spirally or concentrically, centered on the center hole 1. On the track 10, data is divided and recorded by a unit of ECC block 11. The ECC block 11 is a data management unit by which record information is error-correctable.

Incidentally, the present invention is not particularly limited to the optical disc having these three areas. For example, even if the lead-in area 101, the lead-out area 103 or the middle area 104 does not exist, a data structure explained below can be constructed. Moreover, as described later, the lead-in area 101, the lead-out area 103 or the middle area 104 may be further segmentized.

The optical disc 100 in the embodiment, as shown in FIG. 1(*b*), has such a structure that the L0 layer and the L1 layer, which constitute one example of the "first and second record layers" of the present invention descried later, respectively, are laminated on the transparent substrate 106. Upon the recording/reproduction of such a two-layer type optical disc 100, the recording/reproduction in the L0 layer or the L1 layer is performed, depending on which recording layer has the focus position of laser light LB, irradiated from the lower side to the upper side in FIG. 1(*b*). Moreover, the optical disc 100 in the embodiment is not limited to a two-layer single sided type, i.e., a dual layer type, but may be a two-layer double sided type, i.e., a dual layer double sided type. Furthermore, the optical disc 100 in the embodiment is not limited to the optical disc having the two recording layers, as described above, but may be an optical disc of a multilayer type which has three or more layers. Incidentally, a recording/reproducing procedure in the opposite method on the two-layer type optical disc and the data structure of each layer will be discussed later.

(1-2) Detailed Structure

Next, with reference to FIG. 2 and FIG. 3, the detailed structure of the two-layer type optical disc in the embodiment of the information recording medium of the present invention will be explained. More specifically, with reference to FIG. 2 and FIG. 3, an explanation will be given for the data structure of the two-layer type optical disc, an address, such as a physical sector number of a sector constituting an ECC block, in the recording areas of the optical disc, and the recording or reproduction procedure by the opposite method of the optical disc. FIG. 2 is a conceptual graph showing the data structure of the two-layer type optical disc in the embodiment of the information recording medium of the present invention, the address, such as a physical sector number of a sector constituting an ECC block, in the recording areas of the optical disc, and the recording or reproduction method by an opposite method of the optical disc. FIG. 3 are schematic diagrams showing areas in which readable embossed pits can be formed, on the inner and outer circumferential sides of the information recording medium of the present invention. Incidentally, the vertical axis in FIG. 2 indicates the address, such as the physical sector, expressed as hexadecimal numbers, for example, and the horizontal axis indicates a relative position in the radial direction of the optical disc.

As shown in FIG. 2, the two-layer type optical disc 100 in the embodiment of the information recording medium of the present invention is provided with two recording layers, i.e. the L0 layer and the L1 layer, laminated on a not-illustrated transparent substrate. Specifically, the L0 layer is provided with: a recording management area RMA0; a lead-in area 101-0; a data area 102-0; and a middle area 104-0, from the inner to the outer circumferential side. Incidentally, one example of the "predetermined recording area" of the present invention is constructed from a buffer area in which buffer data can be recorded in a finalize process, such as the lead-in area, the middle area, and the lead-out area, for example.

In the RMA 0 (and a RMA 1 described later), RMD (Recording Management Data), which is one example of the "management information" of the present invention, can be recorded. Specifically, in the RMA 0 (RMA 1), the RMD can be written once or additionally recorded about 818 times. The RMA 0 (RMA 1) constitutes one example of the "management area" or another example of the "predetermined recording area" of the present invention.

The lead-in area 101-0 is provided with a control data zone CDZ. In the CDZ, various information, such as the number of recording layers and the direction and track pitch of the recording track, for example, is formed in advance, by using embossed pits, for example, or it is pre-recorded by laser light or the like. In the data area 102-0, record information can be recorded. The middle area 104-0 has a basic function of preventing a recording or reproduction position in the L0 layer and the L1 layer from being away to an unrecorded area or off the substrate; however, it also has a function, as a so-called "jump buffer area", of preventing the recording or reproduction position from being away to the unrecorded area or off the substrate in layer jump.

On the other hand, the L1 layer is provided with: a middle area 104-1; a data area 102-1; a lead-out area 103-1; and a RMA 1, from the outer to the inner circumferential side. More specifically, the RMA 0 (RMA 1) and a not-illustrated calibration area for power calibration of the laser light may be collectively referred to as a "R-Information Area". Moreover, the above-mentioned lead-in area 101-0 (101-1), data area 102-0 (102-1), and middle area 104-0 (104-1) may be collectively referred to as an "Information Area".

The two-layer type optical disc 100 is constructed in the above manner, so that in the recording or reproduction of the optical disc 100, laser light LB is irradiated by an optical pickup or the like of an information recording/reproducing apparatus, which is one specific example of the information recording apparatus of the present invention described later, from the not-illustrated substrate side, i.e., from the lower side to the upper side in FIG. 2, to thereby control the focal distance thereof or the like, and also the travel distance and direction in the radial direction of the optical disc 100. By this, the data is recorded into each recording layer, or the recorded data is reproduced.

As the recording or reproduction procedure for the two-layer type optical disc in the embodiment of the information recording medium of the present invention, the opposite method is adopted. The opposite method herein is, more specifically, such a method that, as the recording or reproduction procedure for the two-layer type optical disc, the optical pickup of the information recording/reproducing apparatus described later is displaced from the inner to the outer circumferential side, i.e. in a direction of a right-pointing arrow in FIG. 2, in the L0 layer, whereas the optical pickup is displaced from the outer to the inner circumferential side, i.e. in a direction of a left-pointing arrow in FIG. 2, in the L1 layer, to thereby perform the recording or reproduction on the two-layer type optical disc. In the opposite method, if the recording or reproduction is ended in the L0 layer, the optical pickup, located on the outermost circumference of the optical disc, does not have to be displaced again to the innermost circumference when the recording or reproduction is started in the L1 layer, and it is only necessary to change the focal distance from the L0 layer to the L1 layer. Thus, there is an advantage that a changing time from the L0 layer to the L1 layer is shorter than that in the parallel method. This is why the opposite method is adopted for the recording of a large-volume of content information.

Specifically, as shown in a graph part of FIG. 2, firstly, in the L0 layer, as the optical pickup is displaced in the lead-in area 101-0, the data area 102-0, and the middle area 104-0, from the inner to the outer circumferential side, the address, such as the sector number, in the recording areas of the optical disc 100 increases. More specifically, the optical pickup sequentially accesses an inner circumferential edge "A1" point, an end position "A2" point of the lead-in area 101-0, a start position "B1" point of the data area 102-0, and an end position "B2" point of the data area 102-0, and the optical pickup is displaced to the middle area 104-0 which functions as the buffer (whose start position is a "C1" point and whose end position is a "C2" point). By this, the recording or reproduction is performed in the L0 layer. On the other hand, in the L1 layer, as the optical pickup is displaced in the middle area 104-1, the data area 102-1, and the lead-out area 103-1, from the outer to the inner circumferential side, the sector number in the recording areas of the optical disc 100 increases. More specifically, the optical pickup sequentially accesses the middle area 104-1 which functions as the buffer (whose start position is a "D1" point and whose end position is a "D2" point), a start position "E1" point of the data area 102-1, and an end position "E2" point of the data area 102-1, and the optical pickup is displaced to the lead-out area 103-1 (whose start position is a "F1" point and whose end position is a "F2" point). By this, the recording or reproduction is performed in the L1 layer.

All the addresses, such as the sector numbers, in the L0 layer and the L1 layer explained above may have a predetermined correlation, such as a 15's complement number relationship in the hexadecimal numbers. More specifically, a turn-around point in the L0 layer (e.g. a sector number of "1AFFFFh") and a turn-around point in the L1 layer (e.g. a sector number of "E5000h") may have the 15's complement number relationship. Incidentally, "h" at the tail of "30000h" or the like in the example indicates that it is expressed as hexadecimal numbers. As a formal matter, the complement number of the "1AFFFFh" is obtained by converting the sector number of "1AFFFFh" in the hexadecimal numbers to a binary number of "000110101111111111111111", inverting the bits to "111001010000000000000000", and reconverting it to the "E50000h" in the hexadecimal numeral.

With respect to the physical sector number explained above, a LBA (Logical Block Address) may be allocated in a one-to-one manner. More specifically, "000000" LBA may correspond to the sector number "030000h", and "17FFFF" LBA may correspond to the sector number "1AFFFFh". Moreover, "180000" LBA may correspond to the sector number "E50000h", and "2FFFEF" LBA may correspond to the sector number "FCFFEFh". Thus, a host computer can perform the recording operation and the reproduction operation, in accordance with the logical block address managed by a file system, for example, without regard to the physical sector number.

In particular, in the two-layer type optical disc in the embodiment of the present invention, readable embossed pits (embossed pits) can be formed in the following areas. Specifically, on the inner circumferential side of the two-layer type optical disc, the readable embossed pits can be formed in (i) an Initial zone, a Buffer zone 0, a Reference Code zone, a Buffer zone 1, and the CDZ in the L0 layer, and (ii) the lead-out area in the L1 layer, in FIG. 3(*a*). More specifically, in an Optional IDTA, located on the innermost circumferential portion of the lead-out area in the L1 layer, power calibration may be performed. On the other hand, on the outer circumferential side of the two-layer type optical disc, the readable embossed pits can be formed in (iii) the middle area in the L0 layer, and (iv) the middle area in the L1 layer, in FIG. 3(*b*). Incidentally, the readable embossed pits are not formed in a RW-physical format information zone, and Extra Border zone, the data area in FIG. 3(*a*), and an ODTA (Outer Disc Testing Area) in which power calibration is performed and the data area in FIG. 3(*b*).

(1-3) Specific Example of Management Information

Next, with reference to FIG. 4, an explanation will be given for one specific example of management information of the present invention and a specific example of embossed information associated with the management information. In particular, the embossed information is preferably recorded in advance by a disc manufacturer onto the information recording medium, by the formation of embossed pits, or by the pre-recording by the laser light. FIG. 4 are a table showing one specific example of the management information of the present invention (FIG. 4(*a*)), a table showing a specific example of the data structure of the embossed information associated with the management information of the present invention (FIG. 4(*b*)), and a table showing a specific example of an EI (Embossed Information) Code associated with first identification information of the present invention (FIG. 4(*c*)).

As shown in FIG. 4(*a*), management information 50 of the present invention may include (i) first identification information for identifying whether or not embossed pits are formed in the control data zone, which is one specific example of the "predetermined recording area" of the present invention, (ii) first identification information for identifying whether or not embossed pits are formed in the lead-in area, which is another specific example of the "predetermined recording area" of the present invention, (iii) first identification information for identifying whether or not embossed pits are formed in the middle area, which is another specific example of the "predetermined recording area" of the present invention, and (iv) first identification information for identifying whether or not embossed pits are formed in the lead-out area, which is another specific example of the "predetermined recording area" of the present invention. Incidentally, the management information 50 may be provided with one field to record therein embossed information 50*a*, in the control data zone CDZ and a RW-physical format information zone, for example, and the disc manufacturer may form or record in advance the embossed information 50*a*, by the formation of embossed pits, or by the pre-recording by laser light. In this case, with respect to the optical disc in the initial state, the information recording/reproducing apparatus firstly records the embossed information 50*a* recorded in one field of the CDZ, for example, into a recording management area RMA (hereinafter referred to as a RMA, as occasion demands). Then, if a pre-recorded area is updated or added in which buffer data, such as dummy data (padding data), which is mostly to set the area to the buffer state for the finalizing, is pre-recorded by the laser light, the information recording/reproducing apparatus may update the embossed information 50*a* in the RMA and use it as the newest information. In particular, the management information in the case where the disc manufacturer records the dummy data, may be referred to as "initial embossed information". In addition, the management information 50 of the present invention may be constructed to hold a field to record therein (i) identification number information, so-called drive ID information (drive IDentification information) about the information recording/reproducing apparatus which performs the recording operation on the optical disc 100, (ii) numerical information about an optimum recording power detected as a result of a calibration process by the information recording/reproducing apparatus designated by a drive ID, and (iii) disc status information indicating (i) an unrecorded or recorded state, (ii) a recording method, such as an incremental recording method, and a (iii) state after a finalize process is performed in which additional (or postscript) writing is impossible, or the like.

Specifically, as shown in FIG. 4(*b*), the embossed information 50*a*, which is one specific example of the management information 50, may include an EI (Embossed Information) Code 51*a*, which is one specific example of the first identification information of the present invention, in a 40th data position, wherein data positions can be designated with numbers of 0 to 2047 allocated by a byte unit, for example. This EI Code 51*a* may have a data amount of 1 byte. More specifically, as shown in FIG. 4(*c*), the EI Code 61*a* may be expressed by combining (i) a predetermined bit pattern indicating whether or not embossed pits are formed in the CDZ, for example, (ii) a predetermined bit pattern indicating whether or not embossed pits are formed in the lead-in area, for example, (iii) a predetermined bit pattern indicating whether or not embossed pits are formed in the middle area, for example, and (iv) a predetermined bit pattern indicating whether or not embossed pits are formed in the lead-out area, for example, Specifically, if the first bit from the right is "0" in the EI Code 51*a*, it may mean that the embossed pits are formed in the CDZ. On the other hand, if the first bit from the right is "1" in the EI Code 51*a*, it may mean that the embossed pits are not formed in the CDZ. Substantially in the same manner, if the second bit from the right is "0" in the EI Code 51*a*, it may mean that the embossed pits are not formed in the lead-in area. On the other hand, if the second bit from the right is "1" in the EI Code 51*a*, it may mean that the embossed pits are formed in the lead-in area. Moreover, substantially in the same manner, if the third bit from the right is "0" in the EI Code 51*a*, it may mean that the embossed pits are not formed in the middle area. On the other hand, if the third bit from the right is "1" in the EI Code 51*a*, it may mean that the embossed pits are formed in the middle area. Moreover, substantially in the same manner, if the fourth bit from the right is "0" in the EI Code 51*a*, it may mean that the embossed pits are not formed in the lead-out area. On the other hand, if the fourth bit from the right is "1" in the EI Code 51*a*, it may mean that the embossed pits are formed in the lead-out area. Incidentally, the fifth to 8th bits from the right may be also set as spare bits. Moreover, it is obvious that the first identification information of the present invention can be realized by various bit patterns. In addition, an effect in changing the recording clock generation process, and an effect in the area in which unreadable embossed pits are formed, will be explained in "(3) Study on operation/effect of embodiments" described later.

(1-3-1) Another Specific Example of Management Information—Part1—

Next, with reference to FIG. 5, an explanation will be given for another specific example of the management information of the present invention, and a specific example of PR (Pre-recorded) information associated with the management information. In particular, the PR information is preferably recorded by the information recording/reproducing apparatus onto the information recording medium, in such a manner that additional recording or rewriting can be performed. FIG. 5 are a table showing another specific example of the management information of the present invention (FIG. 5(*a*)), a table showing a specific example of the data structure of the PR information associated with the management information of the present invention (FIG. 5(*b*)), and a table showing a specific example of a PRI (Pre-recorded Information) Code associated with second identification information of the present invention (FIG. 5(*c*)).

As shown in FIG. 5(*a*), management information 50 of the present invention may include (i-1) second identification information for identifying whether or not pre-recording by laser light is performed in the control data zone, which is one specific example of the "predetermined recording area" of the present invention, (ii-1) second identification information for identifying whether or not pre-recording by laser light is performed in the lead-in area, which is another specific example of the "predetermined recording area" of the present invention, (iii-1) second identification information for identifying whether or not pre-recording by laser light is performed in the middle area, which is another specific example of the "predetermined recording area" of the present invention, and (iv-1) second identification information for identifying whether or not pre-recording by laser light is performed in the lead-out area, which is another specific example of the "predetermined recording area" of the present invention. In addition, the management information 50 of the present invention may include (i-2) position information capable of specifying a position in which the control data zone is recorded, (ii-2) position information capable of specifying a position in which the lead-in area is recorded, (iii-2) position information capable of specifying a position in which the middle area is recorded, and (iv-2) position information capable of specifying a position in which the lead-out area is recorded. Incidentally, the PR information 50*b*, which is one example of the management information 50, may be provided with one field to record therein PR information 50*b* in the control data zone CDZ and the RW-physical format information zone, for example, and the disc manufacturer may form or record in advance the PR information 50*b*, by the formation of embossed pits, or by the pre-recording by laser light. In this case, as described above, with respect to the optical disc in the initial state, the information recording/reproducing apparatus firstly records the PR information 50*b* recorded in one field of the CDZ, for example, into a recording management area RMA (hereinafter referred to as a RMA, as occasion demands). Then, if the pre-recorded area is updated or added in which buffer data, such as dummy data (padding data), which is mostly to set the area to the buffer state for the finalizing, is pre-recorded by the laser light, the information recording/reproducing apparatus may update the PR information 50*b* in the RMA and use it as the newest information. In particular, the PR information 50*b* may be directly recorded into the RMA, for example. Moreover, alternatively, the PR information 50*b* may be included in recording management data RMD (hereinafter referred to as RMD, as occasion demands), and may be able to be recorded indirectly via this RMD.

Specifically, as shown in FIG. 5(*b*), the PR information 50*b*, which is another specific example of the management information 50, may include a PRI (Pre-recorded Information) Code 51*b*, which is one specific example of the second identification information of the present invention, in a 90th data position, wherein data positions can be designated with numbers of 0 to 2047 allocated by a byte unit, for example. This PRI Code 51*b* may have a data amount of 1 byte. Substantially in the same manner, the PR information 50*b* may include address information, which is a specific example of the position information of the present invention, indicating the end edge of the lead-in area pre-recorded by the laser light, in 92nd to 95th data positions, for example. Moreover, the PR information 50*b* may include address information, which is a specific example of the position information of the present invention, indicating the end edge of the middle area in the L0 layer pre-recorded by the laser light, in 96th to 99th data positions, for example. Moreover, the PR information 50*b* may include address information, which is a specific example of the position information of the present invention, indicating the start edge of the middle area in the L1 layer pre-recorded by the laser light, in 100th to 103rd data positions, for example. Moreover, the PR information 50*b* may include address information, which is a specific example of the position information of the present invention, indicating the start edge of the lead-out area pre-recorded by the laser light, in 104th to 107th data positions, for example. These four address information may have a data amount of 4 bytes.

More specifically, as shown in FIG. 5(*c*), the PRI Code 51*b* may be expressed by combining (i) a predetermined bit pattern indicating whether or not pre-recording by laser light is performed in the CDZ, for example, (ii) a predetermined bit pattern indicating whether or not pre-recording by laser light is performed in the lead-in area, for example, (iii) a predetermined bit pattern indicating whether or not pre-recording by laser light is performed in the middle area, for example, and (iv) a predetermined bit pattern indicating whether or not pre-recording by laser light is performed in the lead-out area, for example, Specifically, if the first bit from the right is "0" in the PRI Code 51*b*, it may mean that the pre-recording by the laser light is performed in the CDZ. On the other hand, if the first bit from the right is "1" in the PRI Code 51*b*, it may mean that the pre-recording by the laser light is not performed in the CDZ. Substantially in the same manner, if the second bit from the right is "0" in the PRI Code 51*b*, it may mean that the pre-recording by the laser light is not performed in the lead-in area. On the other hand, if the second bit from the right is "1" in the PRI Code 51*b*, it may mean that the pre-recording by the laser light is performed in the lead-in area. Moreover, substantially in the same manner, if the third bit from the right is "0" in the PRI Code 51*b*, it may mean that the pre-recording by the laser light is not performed in the middle area. On the other hand, if the third bit from the right is "1" in the PRI Code 51*b*, it may mean that the pre-recording by the laser light is performed in the middle area. Moreover, substantially in the same manner, if the fourth bit from the right is "0" in the PRI Code 51*b*, it may mean that the pre-recording by the laser light is not performed in the lead-out area. On the other hand, if the fourth bit from the right is "1" in the PRI Code 51*b*, it may mean that the pre-recording by the laser light is performed in the lead-out area. Incidentally, the fifth to 8th bits from the right may be also set as spare bits. Moreover, it is obvious that the second identification information of the present invention can be realized by various bit patterns.

Consequently, the information recording/reproducing apparatus described later can quickly and accurately recognize (specify) the area in which the buffer data is recorded, in the finalize process, by understanding both the embossed information 50*a* and the PR information 50*b*, which are one specific example of the above-mentioned management information. Incidentally, an effect in changing the recording clock generation process, and an effect in the area in which unreadable embossed pits are formed, will be explained in "(3) Study on operation/effect of embodiments" described later.

(1-3-2) Another Specific Example of Management Information—Part2—

Next, with reference to FIG. 6, an explanation will be given for another specific example of the management information of the present invention, and a specific example of PR (Prerecorded) information associated with the management information. In particular, the PR information is preferably recorded by the information recording/reproducing apparatus onto the information recording medium, in such a manner that additional recording or rewriting can be performed. FIG. 6 are a table showing another specific example of the management information of the present invention (FIG. 6(*a*)), and a table showing a specific example of the data structure of the PR information associated with the management information of the present invention (FIG. 6(*b*)). Incidentally, with regard to the same structure and natures of the PR information 50*b* in the above-mentioned "(1-3-1) Another specific example of management information—part1—", the explanation thereof will be omitted.

As shown in FIG. 6(*a*), management information 50 of the present invention may include (i-1) first identification information for identifying whether or not embossed pits are formed in the control data zone, which is one specific example of the "predetermined recording area" of the present invention, (ii-1) first identification information for identifying whether or not embossed pits are formed in the lead-in area, which is another specific example of the "predetermined recording area" of the present invention, (iii-1) first identification information for identifying whether or not embossed pits are formed in the middle area, which is another specific example of the "predetermined recording area" of the present invention, and (iv-1) first identification information for identifying whether or not embossed pits are formed in the lead-out area, which is another specific example of the "predetermined recording area" of the present invention. In addition, the management information 50 of the present invention may include (i-2) second identification information for identifying whether or not pre-recording by laser light is performed in the control data zone, (ii-2) second identification information for identifying whether or not pre-recording by laser light is performed in the lead-in area, (iii-2) second identification information for identifying whether or not pre-recording by laser light is performed in the middle area, and (iv-2) second identification information for identifying whether or not pre-recording by laser light is performed in the lead-out area. Moreover, in addition, the management information 50 of the present invention may include (i-3) position information capable of specifying a position in which the control data zone is recorded, (ii-3) position information capable of specifying a position in which the lead-in area is recorded, (iii-3) position information capable of specifying a position in which the middle area is recorded, and (iv-3) position information capable of specifying a position in which the lead-out area is recorded.

Specifically, as shown in FIG. 6(*b*), PR information 50*c*, which is another specific example of the management information 50, may include the EI (Embossed Information) Code 51*a*, which is one specific example of the first identification information of the present invention, explained in the above-mentioned FIG. 4, in a 91st data position, wherein data positions can be designated with numbers of 0 to 2047 allocated by a byte unit, for example. The details of the EI Code 51*a* are omitted because they are the same as the explanation in FIG. 4(*c*) described above.

Consequently, the information recording/reproducing apparatus described later can quickly and accurately recognize (specify) the area in which the buffer data is recorded, while identifying the area in which the readable embossed pits are formed and the area in which the pre-recording by the laser light is performed, in the finalize process, by obtaining and understanding only the PR information 50*c* including the EI Code 51*a*. Incidentally, an effect in changing the recording clock generation process, and an effect in the area in which unreadable embossed pits are formed, will be explained in "(3) Study on operation/effect of embodiments" described later.

(1-3-3) Another Specific Example of Management Information—Part3—

Next, with reference to FIG. 7, an explanation will be given for another specific example of the management information of the present invention, and a specific example of embossed information associated with the management information. In particular, the embossed information is preferably recorded in advance by the disc manufacturer onto the information recording medium, by the formation of embossed pits, or by the pre-recording by the laser light. FIG. 7 are a table showing another specific example of the management information of the present invention (FIG. 7(*a*)), and a table showing a specific example of the data structure of the embossed information associated with the management information of the present invention (FIG. 7(*b*)). Incidentally, with regard to the same structure and natures of the embossed information 50*a* in the above-mentioned "(1-3) Specific example of management information", the explanation thereof will be omitted.

As shown in FIG. 7(*a*), management information 50 of the present invention may include (i-1) first identification information for identifying whether or not embossed pits are formed in the control data zone, which is one specific example of the "predetermined recording area" of the present invention, (ii-1) first identification information for identifying whether or not embossed pits are formed in the lead-in area, which is another specific example of the "predetermined recording area" of the present invention, (iii-1) first identification information for identifying whether or not embossed pits are formed in the middle area, which is another specific example of the "predetermined recording area" of the present invention, and (iv-1) first identification information for identifying whether or not embossed pits are formed in the lead-out area, which is another specific example of the "predetermined recording area" of the present invention. In addition, the management information 50 of the present invention may include (i-2) second identification information for identifying whether or not pre-recording by laser light is performed in the control data zone, (ii-2) second identification information for identifying whether or not pre-recording by laser light is performed in the lead-in area, (iii-2) second identification information for identifying whether or not pre-recording by laser light is performed in the middle area, and (iv-2) second identification information for identifying whether or not pre-recording by laser light is performed in the lead-out area.

Specifically, as shown in FIG. 7(*b*), embossed information 50*d*, which is one specific example of the management information 50, may include the EI (Embossed Information) Code 51*a*, which is one specific example of the first identification information of the present invention, in a 40th data position, wherein data positions can be designated with numbers of 0 to 2047 allocated by a byte unit, for example. In addition, it may include the PRI (Pre-recorded Information) Code 51*b*, which is a specific example of the second identification information of the present invention, in a 43rd data position. The details of the EI Code 51$a$ and the PRI Code 51$b$ are omitted because they are the same as the explanation in FIG. 4($c$) and FIG. 5($c$) described above.

Consequently, the disc manufacturer can form in advance the buffer area, such as the lead-in area, for example, even by the pre-recording by the laser light, in addition to the readable embossed pits. Therefore, the information recording/reproducing apparatus described later can quickly and accurately recognize (specify) the area in which the buffer data is recorded, while identifying the area in which the readable embossed pits are formed and the area in which the pre-recording by the laser light is performed, in the finalize process, by obtaining and understanding only the embossed information 50$d$. Incidentally, an effect in changing the recording clock generation process, and an effect in the area in which unreadable embossed pits are formed, will be explained in "(3) Study on operation/effect of embodiments" described later.

(1-3-4) Another Specific Example of Management Information—Part4—

Next, with reference to FIG. 15, an explanation will be given for another specific example of the management information of the present invention, and a specific example of PR (Pre-recorded) information associated with the management information. In particular, the PR information is preferably recorded by the information recording/reproducing apparatus onto the information recording medium, in such a manner that additional recording or rewriting can be performed. FIG. 15 are a table showing another specific example of the management information of the present invention (FIG. 15($a$)), a table showing a specific example of the data structure of the PR information associated with the management information of the present invention (FIG. 15($b$)), and a table showing a specific example of the PRI (Pre-recorded Information) Code associated with third identification information of the present invention (FIG. 15($c$)).

As shown in FIG. 15($a$), management information 50 of the present invention may include (i-1) third identification information for identifying whether or not at least one of (ia) embossed pits are formed and (ib) pre-recording by laser light is performed, in the control data zone, which is one specific example of the "predetermined recording area" of the present invention. In addition, it may include (ii-1) third identification information for identifying whether or not at least one of (iia) embossed pits are formed and (iib) pre-recording by laser light is performed, in the lead-in area, which is another specific example of the "predetermined recording area" of the present invention. In addition, it may include (iii-1) third identification information for identifying whether or not at least one of (iiia) embossed pits are formed and (iiib) pre-recording by laser light is performed, in the middle area, which is another specific example of the "predetermined recording area" of the present invention. In addition, it may include (iv-1) third identification information for identifying whether or not at least one of (iva) embossed pits are formed and (ivb) pre-recording by laser light is performed, in the lead-out area, which is another specific example of the "predetermined recording area" of the present invention. Moreover, in addition, the management information 50 of the present invention may include (i-2) position information capable of specifying a position in which the control data zone is recorded, (ii-2) position information capable of specifying a position in which the lead-in area is recorded, (iii-2) position information capable of specifying a position in which the middle area is recorded, and (iv-2) position information capable of specifying a position in which the lead-out area is recorded. Incidentally, the PR information 50$e$ which is one specific example of the management information 50 may be provided with one field to record therein embossed information 50$a$ in the control data zone CDZ and the RW-physical format information zone, for example, and the disc manufacturer may form or record in advance the embossed information 50$a$, by the formation of embossed pits, or by the pre-recording by laser light. In this case, as described above, with respect to the optical disc in the initial state, the information recording/reproducing apparatus firstly records the PR information 50$e$ recorded in one field of the CDZ, for example, into the RMA. Then, if the pre-recorded area is updated or added in which buffer data, such as dummy data (padding data), which is mostly to set the area to the buffer state for the finalizing, is pre-recorded by the laser light, the information recording/reproducing apparatus may update the PR information 50$e$ in the RMA and use it as the newest information. Alternatively, the PR information 50$e$ may be directly recorded into the RMA, for example. Moreover, alternatively, the PR information 50$e$ may be included in recording management data RMD (hereinafter referred to as RMD, as occasion demands), and may be able to be recorded indirectly via this RMD.

Specifically, as shown in FIG. 15($b$), the PR information 50$e$, which is another specific example of the management information 50, may include a PRI (Pre-recorded Information) Code 51$e$, which is a specific example of the third identification information of the present invention, in a 90th data position, wherein data positions can be designated with numbers of 0 to 2047 allocated by a byte unit, for example. This PRI Code 51$e$ may have a data amount of 1 byte. Substantially in the same manner, the PR information 50$e$ may include address information, which is a specific example of the position information of the present invention, indicating the end edge of the lead-in area, in which (i) the embossed pits are formed or (ii) the pre-recording by the laser light is performed, in 92nd to 95th data positions, for example. Moreover, the PR information 50$e$ may include address information, which is a specific example of the position information of the present invention, indicating the end edge of the middle area in the L0 layer, in which (i) the embossed pits are formed or (ii) the pre-recording by the laser light is performed, in 96th to 99th data positions, for example. Moreover, the PR information 50$e$ may include address information, which is a specific example of the position information of the present invention, indicating the start edge of the middle area in the L1 layer, in which (i) the embossed pits are formed or (ii) the pre-recording by the laser light is performed, in 100th to 103rd data positions, for example. Moreover, the PR information 50$e$ may include address information, which is a specific example of the position information of the present invention, indicating the start edge of the lead-out area, in which (i) the embossed pits are formed or (ii) the pre-recording by the laser light is performed, in 104th to 107th data positions, for example. These four address information may have a data amount of 4 bytes.

More specifically, as shown in FIG. 15($c$), the PRI Code 51$e$ may be expressed by combining (i) a predetermined bit pattern indicating whether or not (ia) embossed pits are formed or (ib) pre-recording by laser light is performed, in the CDZ, for example, (ii) a predetermined bit pattern indicating whether or not (iia) embossed pits are formed or (iib) pre-recording by laser light is performed, in the lead-in area, for example, (iii) a predetermined bit pattern indicating whether or not (iiia) embossed pits are formed or (iiib) pre-recording by laser light is performed, in the middle area, for example, and (iv) a predetermined bit pattern indicating whether or not (iva) embossed pits are formed or (ivb) pre-recording by laser light is performed, in the lead-out area, for example, Specifically, if the first bit from the right is "0" in the PRI Code 51*e*, it may mean that (ia) the embossed pits are formed or (ib) the pre-recording by the laser light is performed in the CDZ. On the other hand, if the first bit from the right is "1" in the PRI Code 51*e*, it may mean that (ia) the embossed pits are not formed and (ib) the pre-recording by the laser light is not performed in the CDZ. Specifically, the first bit from the right in the PRI Code 51*e* may be logical sum of information, such as a flag, indicating (ia) whether or not embossed pits are formed, and information, such as a flag, indicating (ib) whether or not pre-recording by laser light is performed. More specifically, the first bit from the right is "1" in the PRI Code 51*e* may be in the following three cases. Namely, the first case is where the entire CDZ is formed only by using embossed pits. The second case is where only the pre-recording by the laser light is performed in the entire CDZ. The third case is where embossed pits are formed and the pre-recording by the laser light is performed in the CDZ. Incidentally, the third case may be able to be omitted in the embodiment.

Substantially in the same manner, if the second bit from the right is "0" in the PRI Code 51*e*, it may mean that (iia) the embossed pits are not formed and (iib) the pre-recording by the laser light is not performed in the lead-in area. Particularly in this case, the information recording/reproducing apparatus described later can judge that it is necessary to record the buffer data, such as dummy data, for example, in the finalize process, because the embossed pits are not formed and the pre-recording is not performed in at least one portion of the lead-in area. On the other hand, if the second bit from the right is "1" in the PRI Code 51*e*, it may mean that (iia) the embossed pits are formed or (iib) the pre-recording by the laser light is performed in the lead-in area. Moreover, substantially in the same manner, if the third bit from the right is "0" in the PRI Code 51*e*, it may mean that (iiia) the embossed pits are not formed and (iiib) the pre-recording by the laser light is not performed in the middle area. On the other hand, if the third bit from the right is "1" in the PRI Code 51*e*, it may mean that (iiia) the embossed pits are formed or (iiib) the pre-recording by the laser light is performed in the middle area. Moreover, substantially in the same manner, if the fourth bit from the right is "0" in the PRI Code 51*e*, it may mean that (iva) the embossed pits are not formed and (ivb) the pre-recording by the laser light is not performed in the lead-out area. On the other hand, if the fourth bit from the right is "1" in the PRI Code 51*e*, it may mean that (iva) the embossed pits are formed or (ivb) the prerecording by the laser light is performed in the lead-out area. Incidentally, the fifth to 8th bits from the right may be also set as spare bits. Moreover, it is obvious that the third identification information of the present invention can be realized by various bit patterns.

In particular, in the PRI Code 51*e*, at least one portion of the bit pattern may be fixed and used. For example, the embossed pits may be always formed in the CDZ, and the first bit from the right in the PRI Code 51*e* may be always fixed to "0" and used.

Consequently, the information recording/reproducing apparatus described later can quickly and accurately recognize (specify) the area in which the buffer data is recorded, in the finalize process, by obtaining and understanding the embossed information 50*e*, which is another specific example of the above-mentioned management information. Incidentally, an effect in changing the recording clock generation process, and an effect in the area in which unreadable embossed pits are formed, will be explained in "(3) Study on operation/effect of embodiments" described later.

(2) Embodiment of Information Recording Apparatus

Next, with reference to FIG. 8 to FIG. 11, the structure and the operation of an embodiment of the information recording apparatus of the present invention will be explained in detail. In particular, the embodiment is an example in which the information recording apparatus of the present invention is applied to an information recording/reproducing apparatus for an optical disc.

(2-1) Basic Structure

Firstly, with reference to FIG. 8, an explanation will be given for the basic structures of an information recording/reproducing apparatus 300 in the embodiment of the information recording apparatus of the present invention and a host computer 400. FIG. 8 is a block diagram showing the basic structures of the information recording/reproducing apparatus in the embodiment of the information recording apparatus of the present invention and the host computer. Incidentally, the information recording/reproducing apparatus 300 has a function of recording record data onto the optical disc 100 and a function of reproducing the record data recorded on the optical disc 100.

With reference to FIG. 8, the inner structure of the information recording/reproducing apparatus 300 will be explained. The information recording/reproducing apparatus 300 is an apparatus for recording information onto the optical disc 100 and reading the information recorded on the optical disc 100, under the control of a CPU (Central Processing Unit) 305 for drive.

The information recording/reproducing apparatus 300 is provided with: the optical disc 100; an optical pickup 301; a signal recording/reproducing device 302; an address detector 303; the CPU (drive control device) 305; a spindle motor 306; a memory 307; a data input/output control device 308; and a bus 309.

Moreover, the host computer 400 is provided with: a CPU (host control device) 401; a memory 402; an operation control device 403; an operation button 404; a display panel 405; a data input/output control device 406; and a bus 407.

In particular, the information recording/reproducing apparatus 300 may be constructed to be capable of communicating with an external network, by housing the host computer 400 provided with a communication device, such as a modern, for example, in the same package. Alternatively, the information recording/reproducing apparatus 300 may be constructed to be capable of communicating with an external network, by that the CPU (host control device) 401 of the host computer 400 provided with a communication device, such as an i-link, directly controls the information recording/reproducing apparatus 300 via the data input/output control device 308 and the bus 309.

The optical pickup 301 performs the recording/reproduction with respect to the optical disc 100 and is provided with: a semiconductor laser apparatus; and a lens. More specifically, the optical pickup 301 irradiates the optical disc 100 with a light beam, such as a laser beam, as reading light with a first power upon reproduction, and as writing light with a second power upon recording, with it modulated.

The signal recording/reproducing device 302 performs the recording/reproduction with respect to the optical disc 100 by controlling the optical pickup 301 and the spindle motor 306. More specifically, the signal recording/reproducing device 302 is provided with a laser diode (LD) driver, a head amplifier, and the like. The LD driver drives the not-illustrated semiconductor laser built in the optical pickup 301. The head amplifier amplifies the output signal of the optical pickup 301, i.e., the reflected light of the light beam, and outputs the amplified signal. More specifically, the signal recording/reproducing device 302 drives the not-illustrated semiconductor laser built in the optical pickup 301 so as to determine an optimum laser power by a process of recording and reproducing an OPC pattern, together with a not-illustrated timing generator, under the control of the CPU 305, at the time of OPC (Optimum Power Control) process. In particular, the signal recording/reproducing device 302 constitutes one example of the "recording device" and the "reproducing device" of the present invention, with the optical pickup 301. Moreover, the signal recording/reproducing device 302 may be capable of obtaining the management information 50 recorded in the control data zone CDZ or the recording management area RMA 0 (RMA 1), for example. Thus, the signal recording/reproducing device 302 may constitute one example of the "obtaining device" of the present invention.

The address detector 303 detects the address (address information) on the optical disc 100, from a reproduction signal including a pre-format address signal or the like, outputted by the signal recording/reproducing device 302.

The CPU (drive control device) 305 controls the entire information recording/reproducing apparatus 300 by giving instructions to various control devices through the bus 309. Incidentally, software or firmware for operating the CPU 305 is stored in the memory 307. In particular, the CPU 305 is one example of the "controlling device" of the present invention.

The spindle motor 306 is intended to rotate and stop the optical disc 100, and operates in accessing the optical disc 100. More specifically, the spindle motor 306 is constructed to rotate and stop the optical disc 100 at a predetermined speed under spindle servo by a not-illustrated servo unit or the like.

The memory 307 is used in the general data processing and the OPC processing on the information recording/reproducing apparatus 300, including a buffer area for the record/reproduction data, an area used as an intermediate buffer when data is converted into the data that can be used on the signal recording/reproducing device 302, and the like. Moreover, the memory 307 is provided with: a ROM area into which a program for performing an operation as a recording device, i.e. firmware, is stored; a buffer for temporarily storing the record/reproduction data; a Random Access Memory (RAM) area into which a parameter required for the operation of the firmware program or the like is stored; and the like.

The data input/output control device 308 controls the data input/output from the outside with respect to the information recording/reproducing apparatus 300, and performs storage and export with respect to the data buffer on the memory 307. A drive control command, which is issued from the external host computer 400 (hereinafter referred to as a "host", as occasion demands) connected to the disc drive 301 via an interface, such as a SCSI (Small Computer System Interface) and an ATAPI (AT Attachment Packet Interface), is transmitted to the CPU 305 through the data input/output control device 308. Moreover, the record/reproduction data is also exchanged with the host computer 400 through the data input/output control device 308 in the same manner.

The CPU (host control device) 401, the memory 402, the data input/output control device 406, and the bus 407 of the host computer 400 are substantially the same as the corresponding constituent elements in the information recording/reproducing apparatus 300.

The operation control device 403 performs the reception of an operation instruction and display with respect to the host computer 400. The operation control device 403 sends an instruction of recording or reproduction by using the operation bottom 404, for example, to the CPU 401. The CPU 401 sends a control command to the information recording/reproducing apparatus 300 through the input/output control device 402, on the basis of the instruction information from the operation control device 403, to thereby control the entire information recording/reproducing apparatus 300. In the same manner, the CPU 401 can send a command of requiring the information recording/reproducing apparatus 300 to send the operation condition to the host, to the information recording/reproducing apparatus 300. By this, it is possible to recognize the operation condition of the information recording/reproducing apparatus 300, such as during recording and during reproduction. Thus, the CPU 401 can output the operation condition of the information recording/reproducing apparatus 300, to the display panel 405, such as a fluorescent tube and a LCD, through the operation control device 403.

One specific example used by combining the information recording/reproducing apparatus 300 and the host computer 400, as explained above, is household equipment, such as recorder equipment for recording/reproducing video images. The recorder equipment records a video signal from a broadcast reception tuner and an external connection terminal, onto a disc, and outputs the video signal reproduced from the disc, to external display equipment, such as a television. The operation as the recorder equipment is performed by executing a program stored in the memory 402, on the CPU 401. Moreover, in another specific example, the information recording/reproducing apparatus 300 is a disc drive (hereinafter referred to as a drive, as occasion demands), and the host computer 400 is a personal computer or a workstation. The host computer 400, such as the personal computer, and the drive are connected to each other through the data input/output control device 308 (406), such as the SCSI and the ATAPI. An application, such as writing software, which is installed in the host computer, controls the disc drive.

(2-2) Operation Principle

Next, with reference to FIG. 8 described above, as occasion demands, in addition to FIG. 9 to FIG. 11, an explanation will be given for the operation principle of the information recording/reproducing apparatus 300 in the embodiment of the information recording apparatus of the present invention. FIG. 9 is a flowchart showing a process of obtaining an EI (Embossed Information) Code 51*a* by the information recording/reproducing apparatus in the embodiment of the information recording apparatus of the present invention. FIG. 10 is a flowchart showing a pre-recording process by the information recording/reproducing apparatus in the embodiment of the information recording apparatus of the present invention. FIG. 11 is a flowchart showing a process of updating a PRI Code 51*b* by the information recording/reproducing apparatus in the embodiment of the information recording apparatus of the present invention.

(2-2-1) EI (Embossed Information) Code Obtaining Process

As shown in FIG. 9, in the process of obtaining the EI Code 51*a*, firstly, under the control of the CPU (drive control device) 305, it is judged whether or not the optical disc is inserted (step S101). If the optical disc is inserted (the step S101: Yes), the EI Code 51*a* recorded in advance in the CDZ is read, under the control of the CPU 305 (step S102).

Then, under the control of the CPU 305, (i) information about a position in which the recording clock generation process is changed so as to generate a recording clock from the readable embossed pits, and (ii) information about a position in which the recording clock generation process is changed so as to generate a recording clock from the land pre-pits, as usual, are obtained on the basis of the read EI Code 51*a*. In addition, information about the position of the area in which unreadable embossed pits are formed and a reproduction error easily occurs, for example, is obtained (step S103).

Then, under the control of the CPU 305, the newest RMD (Recording Management Data) recorded in the RMA is reproduced, and the PRI Code 51*b* is read (step S104).

Then, under the control of the CPU 305, it is judged whether or not the EI Code 51*a* is recorded in the reproduced newest RMD (step S105). If the EI Code 51*a* is not recorded in the reproduced newest RMD (the step S105: No), the RMD including the EI Code 51*a* read from the CDZ is recorded into the RA as the newest RMD, under the control of the CPU 305 (step S106). Specifically, the EI Code 51*a* may be copied to the 91th data position in the PR information 50*c* in FIG. 6 described above.

Then, under the control of the CPU 305, the position of the area in which the buffer data needs to be recorded in the finalize process (e.g. the lead-in area, the lead-out area, and the middle area, etc.) is recognized (specified) from the EI Code 51*a* and the PRI Code 51*b* included in the newest RMD (step S107).

On the other hand, as a result of the judgment in the step S105, if the EI Code 51*a* is recorded in the reproduced RMD (the step S105: Yes), the above-mentioned step S106 is omitted. Moreover, on the other hand, as a result of the judgment in the step S101, if the optical disc is not inserted (the step S101: No), it is judged again whether or not the optical disc is inserted (the step S101).

(2-2-2) Pre-recording Process

As shown in FIG. 10, in the process of pre-recording by the laser light (hereinafter referred to as a "pre-recording process, as occasion demands), firstly, it is judged whether or not a pre-write command, for example, to start the pre-recording process is issued from the host computer, under the control of the CPU 305 (step S201). If the pre-write command to start the pre-recording process is issued (the step S201: Yes), information about an address at which the pre-recording is started, in the area in which the buffer data needs to be recorded in the finalize process, is obtained from the PRI Code 51*b* included in the newest RMD, under the control of the CPU 305 (step S202). On the other hand, if the pre-write command to start the pre-recording process is not issued (the step S201: No), the issue is waited for again.

Then, under the control of the CPU 305, the EI Code 51*a* recorded in advance in the CDZ is read, and on the basis of the read EI Code 51*a*, (i) the information about the position in which the recording clock generation process is changed so as to generate a recording clock from the readable embossed pits, and (ii) the information about the position in which the recording clock generation process is changed so as to generate a recording clock from the land pre-pits, as usual, are obtained. In addition, the information about the position of the area in which the unreadable embossed pits are formed and the reproduction error easily occurs, for example, is obtained (step S203). If the information recording medium is inserted to another information recording/reproducing apparatus, it is hardly possible to judge whether or not the information recording medium is the one formed with the readable embossed pits, or the one on which the buffer data is recorded later by the information recording/reproducing apparatus, only by reading the newest RMD. As opposed to this, in the present invention, on the basis of the EI Code 51*a* read from the CDZ recorded in advance by the disc manufacturer, (i) the information about the position in which the recording clock generation process is changed so as to generate a recording clock from the readable embossed pits, and (ii) the information about the position in which the recording clock generation process is changed so as to generate a recording clock from the land pre-pits, as usual, are obtained. In addition, the information about the position of the area in which the unreadable embossed pits are formed and the reproduction error easily occurs, for example, is obtained Then, under the control of the CPU 305, the pre-recording of the buffer data, for example, is performed (step S204).

Then, under the control of the CPU 305, it is judged whether or not the PRI Code 51*b* is updated (step S205). If the PRI Code 51*b* is updated (the step S205: Yes), a process of updating the PRI Code 51*b* is performed, under the control of the CPU 305 (step S206). On the other hand, if the PRI Code 51*b* is not updated (the step S205: No), the pre-recording process is ended, as it is.

(2-2-3) PR Information Updating Process

As shown in FIG. 11, in the process of updating the PR information 50*b* (50*c*), firstly, under the control of the CPU 305, it is judged whether or not a command to update the PR information 50*b* (50*c*) is issued from the host computer, for example (step S301). In particular, the CPU 305 may be constructed to judge this on its own, in predetermined timing or in response to a predetermined event.

Then, under the control of the CPU 305, the start address and the end address of the area (recording area) in which the pre-recording is performed are obtained (step S302).

Then, the PR Code owned by the PR information 50*b* (50*c*) included in the newest RMD is updated, and at the same time, the start address and the end address indicating the area (recording area) in which the pre-recording is newly performed are added and, the PR information 50*b*(50*c*) is recorded into the RMA as the newest RMD (step S303).

Consequently, the information recording/reproducing apparatus recognizes (specifies) the position of the area (e.g. the lead-in area, the lead-out area, and the middle area, etc.) in which the buffer data needs to be recorded in the finalize process, from the EI Code 51*a* and the PRI Code 51*b* included in the newest RMD.

Incidentally, the above-mentioned process of updating the PRI Code and the PR information 50*b* (50*c*) may be performed on a storage device, such as a memory, for example, on the information recording/reproducing apparatus, and may be recorded into the RMA when the optical disc is ejected, for example. Alternatively, the recording for updating the PRI Code and the PR information 50*b* (50*c*) may be performed directly on the RMA of the optical disc at each time of the updating.

(3) Study on Operation/effect of Embodiments

Next, with reference to FIG. 12 and FIG. 13, the operation/effect of the embodiment will be studied. FIG. 12 are schematic diagrams showing areas in which readable embossed pits are formed, on the inner and outer circumferential sides of the information recording medium of the present invention. FIG. 13 are schematic diagrams showing areas in which readable embossed pits are formed and areas in which unreadable embossed pits are formed, on the inner and outer circumferential sides of the information recording medium of the present invention.

In general, for example, in the DVD-RW DL (Dual Layer), it is possible to form the readable embossed pits in areas in gray in FIG. 12 and FIG. 13. In the areas in which the readable embossed pits are formed, the land pre-pits are not superimposed or overlapped, in order to reduce an influence by interference of the readable embossed pits and the land pre pits (LPP). Therefore, if the recording is started in an area (Groove area) adjacent to one portion of the area in which the readable embossed pits are formed in the buffer area, such as the lead-in area, the lead-out area, and the middle area, for example, the following technical problem occurs. Namely, because the land pre pits are not formed in the adjacent readable embossed area, it is technically difficult to generate a recording clock from the land pre-pits at the time point of starting the recording in the recordable area located immediately after the adjacent readable embossed area.

Thus, the following two methods are generally proposed. Namely, there is proposed (i) a method of generating a recording clock from the readable embossed pits formed in the buffer area, such as the lead-in area, for example. Alternatively, there is also proposed (ii) a method of providing the area in which the unreadable embossed pits are formed on which the land pre-pits can be overlapped, in the area adjacent to the readable embossed pits formed in the buffer area, such as the lead-in area, for example, as in the existing DVD-RW. The "unreadable embossed pit" herein is a pit aiming at enabling the information recording/reproducing apparatus to perform tracking servo, not holding information, such as the address, and having less irregularity (or less deepness, or less height) than that of the readable embossed pit.

In contrast, in the optical disc in the embodiment, the management information including the first identification information for identifying whether or not embossed pits are formed in the predetermined recording area of the present invention can be recorded, so that it is possible to receive the following four effects.

As the first effect, if the above-mentioned method (i) is adopted, firstly, the first identification information (the above-mentioned EI Code 51*a*) for identifying whether or not readable embossed pits are formed is obtained by the information recording/reproducing apparatus. Then, the information recording/reproducing apparatus can recognize (specify) the position or the like of the area in which the readable embossed pits are formed, so that it can properly perform the recording clock generation process if the recording is performed into the area located immediately after the readable embossed area. Namely, in the case of the recording into the area located immediately after the readable embossed area, the recording clock generation process is changed so as to generate a recording clock from the readable embossed pits, instead of the land pre-pits, in the readable embossed area located a little before (refer to white arrows in FIG. 12). Specifically, the recording clock generation process is performed so as to generate a recording clock from the readable embossed pits, up to the end edge of the Buffer zone 0 and the end edge of the CDZ in the L0 layer and the middle of the lead-out area in the L1 layer in FIG. 12(*a*), and the middle of the middle area in the L0 layer and the end edge of the middle area in the L1 layer in FIG. 12(*b*).

After that, if a laser for recording enters the area in which the recording is to be started and the readable embossed pits are not formed, the recording is started, and simultaneously, the recording clock generation process is changed so as to generate a recording clock from the land pre-pits, as usual, instead of the readable embossed pits (refer to black arrows in FIG. 12). Specifically, the recording clock generation process is performed so as to generate a recording clock from the land pre-pits, as usual, from the start edge of the RW-Physical format information zone and the start edge of the Extra Border Zone in the L0 layer and the middle of the lead-out area in the L1 layer in FIG. 12(*a*), and the middle of the middle area in the L0 layer and the end edge of the middle area in the L1 layer in FIG. 12(*b*). By performing such a recording clock generation process, it is possible to properly perform the recording into the area located immediately after the readable embossed area.

As the second effect, if the above-mentioned method (ii) is adopted, firstly, the first identification information (the EI Code) for identifying whether or not readable embossed pits are formed is obtained by the information recording/reproducing apparatus, for example. Then, the information recording/reproducing apparatus can recognize (specify) the position of the area in which the readable embossed pits are formed, and the position of the area, located adjacent thereto, in which the unreadable embossed pits are formed (refer to black portions in FIG. 13). Therefore, even if it cannot obtain the address information because a reproduction error occurs, for example, in the area in which the unreadable embossed pits are formed, the information recording/reproducing apparatus can realize the recording/reproducing operation including a fail safe process, such as predicting and ignoring the reproduction error which occurs in this area.

As the third effect, for example, the information recording/reproducing apparatus hardly needs or does not need at all to perform RF search or LPP search to search for the area in which the readable embossed pits are formed, so that it is possible to omit a time length required for the search from the recording/reproducing process. In the case of the information recording medium, such as the DVD-R DL, for example, there is no management information including the first identification information for identifying whether or not embossed pits are formed. Thus, in the conventional technologies, it is hardly possible to read the position or the record information about the position in which the recording clock generation process is changed, and the record information. At the same time, in order to recognize (specify) the position of the unreadable area in which the unreadable embossed pits are formed, the information recording/reproducing apparatus itself needs to perform (i) the RF search for searching for an area in which a RF signal can be obtained and (ii) the LPP search for searching for an area in which an LPP signal can be obtained, for example, which causes extra time for the search.

In contrast, in the present invention, the management information including the first identification information for identifying whether or not embossed pits are formed in the predetermined recording area of the present invention can be obtained by the information recording/reproducing apparatus, for example. Thus, it does not need to perform the RF search and the LPP search, for example, so that it is possible to omit a time length required for the search from the recording/reproducing process.

As the fourth effect, the information recording/reproducing apparatus recognizes or understands the first identification information (the EI Code 51*a*) of the present invention, in addition to the second identification information (the PRI Code 51*b*) included in the above-mentioned management information, by which it can quickly and accurately recognize (specify) the area in which the buffer data is recorded, while identifying the area in which the readable embossed pits are formed and the area in which the pre-recording by the laser light is performed, in the finalize process. Specifically, on the basis of the first identification information, it is possible to recognize (specify) the area in which the embossed pits are formed by the disc manufacturer and in which the buffer data does not have to be recorded. In addition, on the basis of the second identification information, it is possible to recognize (specify) the area in which the buffer data is already recorded by the pre-recording process, for example, by the information recording/reproducing apparatus and in which the buffer data does not have to be recorded in the finalize process. As a result, it is possible to realize great reduction and more efficient reduction in the time length for the finalize process, which enables the user to feel greater comfort in the finalize process.

(4) Second Embodiment of Information Recording Medium

Next, with reference to FIG. 14, the detailed structure of a single-layer type optical disc in a second embodiment of the information recording medium of the present invention will be discussed. More specifically, with reference to FIG. 14, an explanation will be given for the data structure of the single-layer type optical disc, the address, such as a physical sector number of a sector constituting an ECC block, in the recording areas of the optical disc, and the recording or reproduction procedure by the opposite method of the optical disc. Incidentally, the vertical axis in FIG. 14 indicates the address, such as the physical sector, expressed as hexadecimal numbers, for example, and the horizontal axis indicates a relative position in the radial direction of the optical disc.

As shown in FIG. 14, a single-layer type optical disc 100*a* in the second embodiment of the information recording medium of the present invention is provided with a recording layer laminated on a not-illustrated transparent substrate. The recording layer is provided with: an inner disc testing area IDTA; a recording management area RMA; a lead-in area 101; a data area 102; a lead-out area 103; and an outer disc testing area ODTA, from the inner to the outer circumferential side. Incidentally, arrows in the IDTA and the ODTA indicate directions of consuming the recording areas for power calibration.

In the above-mentioned embodiments, an explanation was given for a two layer type or single layer type optical disc on which recording or reproduction can be performed by using laser light, such as blue ray, red LD light, and infrared light, as one specific example of the information recording medium. In addition, the present invention can be also applied to a multilayer type (multiple layer type) optical disc provided with three or more recording layers, for example. Moreover, it can be also applied to other various information recording media supporting high-density recording or high transfer rate.

Moreover, in the above-mentioned embodiment, an explanation was given for the information recording/reproducing apparatus compatible with the two layer type or single layer type optical disc, for example, as one specific example of the information recording apparatus and the information reproducing apparatus. In addition, the present invention can be also applied to an information recording/reproducing apparatus compatible with a multilayer type (multiple layer type) optical disc provided with three or more recording layers, for example. Moreover, it can be also applied to an information recording/reproducing apparatus compatible with other various information recording media supporting high-density recording or high transfer rate.

The present invention is not limited to the aforementioned embodiments, and various changes may be made, if desired, without departing from the essence or spirit of the invention which can be read from the claims and the entire specification. An information recording medium, an information recording apparatus and method, an information reproducing apparatus and method, and a computer program, all of which involve such changes, are also intended to be within the technical scope of the present invention.

INDUSTRIAL APPLICABILITY

The information recording medium, the information recording apparatus and method, the information reproducing apparatus and method, and the computer program according to the present invention can be applied to an optical disc on which recording and reproduction can be performed by irradiating laser light, such as a DRD (Digital Versatile Disc), a BD (Blu-ray Disc), and a CD (Compact Disc), and they can be further applied to a recording apparatus and a reproducing apparatus for the information recording medium. Moreover, they can be applied to an information recording apparatus, an information reproducing apparatus, or the like, which is mounted on various computer equipment for consumer use or for business use, or which can be connected to various computer equipment.

The invention claimed is:

1. An information recording medium, comprising:

a recording layer having one or a plurality of predetermined recording areas in which record data including management information or buffer data can be recorded; and a management area in which the management information can be recorded, the management information including first identification information for identifying whether or not embossed pits are formed in the predetermined recording area.

2. The information recording medium according to claim 1, wherein the management information includes second identification information for identifying whether or not pre-recording by laser light is performed in the predetermined recording area.

3. The information recording medium according to claim 1, wherein the management information includes third identification information for identifying whether or not at least one of (i) embossed pits are formed and (ii) pre-recording by laser light is performed, in the predetermined recording area.

4. The information recording medium according to claim 1, wherein the management information includes position information capable of specifying a position in which (i) embossed pits are formed or a position in which (ii) pre-recording by laser light is performed, in the predetermined recording area.

5. The information recording medium according to claim 1, wherein the first identification information can identify (i) whether or not embossed pits are formed in at least one portion of the predetermined recording area, or (ii) whether or not embossed pits are formed in one portion or all of the predetermined recording area.

6. The information recording medium according to claim 1, wherein at least the first identification information can identify whether or not embossed pits are formed, in the plurality of predetermined recording areas, in a predetermined bit pattern.

7. The information recording medium according to claim 1, wherein the management information is recorded in advance by (i) formation of embossed pits or (ii) pre-recording by laser light, in the management area.

8. The information recording medium according to claim 1, wherein the predetermined recording area is at least one of a control data zone, a lead-in area, a middle area, and a lead-out area.

9. The information recording medium according to claim 1, wherein the management information includes information about a recording capacity of an unreadable area in which the record information cannot be read, in which unreadable embossed pits are formed and which is adjacent to the predetermined recording area.

10. An information recording apparatus for recording the record data onto said information recording medium according to claim 1, said information recording apparatus comprising:

an obtaining device for obtaining the management information from the management area;

a recording device for recording the record data; and a controlling device for controlling said recording device to record the record data, on the basis of the obtained management information.

11. The information recording apparatus according to claim 10, further comprising an updating device for updating the management information on the basis of the recording of the record data.

12. The information recording apparatus according to claim 10, wherein said controlling device controls said recording device to record buffer data in a finalize process.

13. The information recording apparatus according to claim 10, wherein said controlling device controls said recording device to record buffer data in a pre-recording process.

14. An information reproducing apparatus for reproducing the record data from said information recording medium according to claim 1, said information reproducing apparatus comprising:

an obtaining device for obtaining the management information from the management area;

a reproducing device for reproducing the record data; and a controlling device for controlling said reproducing device to reproduce the record data, on the basis of the obtained management information.

15. An information recording method in an information recording apparatus comprising a recording device for recording the record data onto said information recording medium according to claim 1, said information recording method comprising:

an obtaining process of obtaining the management information from the management area; and a controlling process of controlling said recording device to record the record data, on the basis of the obtained management information.

16. An information reproducing method in an information reproducing apparatus comprising a reproducing device for reproducing the record data from said information recording medium according to claim 1, said information reproducing method comprising:

an obtaining process of obtaining the management information from the management area; and a controlling process of controlling said reproducing device to reproduce the record data, on the basis of the obtained management information.

* * * * *